United States Patent
Mangum et al.

(10) Patent No.: US 11,897,578 B2
(45) Date of Patent: Feb. 13, 2024

(54) SNOW VEHICLE

(71) Applicant: Polaris Industries Inc., Medina, MN (US)

(72) Inventors: Allen M. Mangum, Idaho Falls, ID (US); Jimmy D. Brooks, Naples, ID (US)

(73) Assignee: Polaris Industries Inc., Medina, MN (US)

( * ) Notice: Subject to any disclaimer, the term of this patent is extended or adjusted under 35 U.S.C. 154(b) by 207 days.

(21) Appl. No.: 17/144,820

(22) Filed: Jan. 8, 2021

(65) Prior Publication Data

US 2021/0129943 A1    May 6, 2021

Related U.S. Application Data

(63) Continuation of application No. 15/927,628, filed on Mar. 21, 2018, now Pat. No. 10,899,415.

(Continued)

(51) Int. Cl.
*B62M 27/02* (2006.01)
*B62D 55/07* (2006.01)
*B62D 55/10* (2006.01)
*B62D 55/108* (2006.01)
*B62D 55/12* (2006.01)

(52) U.S. Cl.
CPC ............ *B62M 27/02* (2013.01); *B62D 55/07* (2013.01); *B62D 55/10* (2013.01); *B62D 55/108* (2013.01); *B62D 55/12* (2013.01); *B62M 2027/021* (2013.01); *B62M 2027/022* (2013.01); *B62M 2027/023* (2013.01); *B62M 2027/026* (2013.01);

(Continued)

(58) Field of Classification Search
CPC ............ B62M 27/02; B62M 2027/021; B62M 2027/022; B62M 2027/023; B62M 2027/026; B62M 2027/027; B62M 2027/028; B62D 55/07; B62D 55/10; B62D 55/108; B62D 55/12
USPC ........................................ 180/9.5
See application file for complete search history.

(56) References Cited

U.S. PATENT DOCUMENTS 3,336,994 A    8/1967  Pederson
3,527,505 A    9/1970  Hetteen
(Continued)

FOREIGN PATENT DOCUMENTS

AT    242150 T    6/2003
CA    2321860 A1  9/1999
(Continued)

OTHER PUBLICATIONS

"All Skis are not created equal", Web Page, <http://amsnow.com/how-to-tech/2005/09/all-skis-are-not-created-equal> Nov. 2005; 3 pages.

(Continued)

*Primary Examiner* — Kevin Hurley
*Assistant Examiner* — Felicia L. Brittman
(74) *Attorney, Agent, or Firm* — Faegre Drinker Biddle & Reath LLP

(57) ABSTRACT

A snow vehicle is disclosed comprising a uni-body frame having a forward engine compartment, a propulsion unit coupled to the frame, and a front ski steered by a steering (Continued)

mechanism. The snow vehicle has a chain coupling the sprocket of the propulsion unit located outside of the frame and directly coupled to the belt drive.

19 Claims, 23 Drawing Sheets

Related U.S. Application Data

(60) Provisional application No. 62/474,876, filed on Mar. 22, 2017.

(52) U.S. Cl.
CPC . *B62M 2027/027* (2013.01); *B62M 2027/028* (2013.01)

(56) References Cited

U.S. PATENT DOCUMENTS

| | | | |
|---|---|---|---|
| 3,545,821 A | 12/1970 | Erickson |
| 3,630,301 A | 12/1971 | Henricks |
| 3,705,749 A | 12/1972 | Harvey |
| 3,718,341 A | 2/1973 | Westberg |
| 3,719,369 A | 3/1973 | Savage |
| 3,779,326 A | 12/1973 | Trautwein |
| 3,809,172 A | 5/1974 | Hendrickson et al. |
| 3,822,755 A | 7/1974 | Hine |
| 3,844,367 A | 10/1974 | Flohr |
| 3,857,578 A | 12/1974 | Alton |
| 3,872,938 A | 3/1975 | Degroot |
| RE28,423 E | 5/1975 | Higginbotham et al. |
| 3,931,861 A | 1/1976 | Olson |
| 3,933,214 A | 1/1976 | Guibord |
| 3,964,561 A | 6/1976 | Lunzer et al. |
| 3,977,485 A | 8/1976 | West et al. |
| 3,982,597 A | 9/1976 | Callaway |
| 4,034,820 A | 7/1977 | Barnhardt |
| 4,108,453 A | 8/1978 | Lavalier |
| 4,131,292 A | 12/1978 | Swech |
| 4,133,400 A | 1/1979 | Shiraishi |
| 4,244,436 A | 1/1981 | Condon et al. |
| 4,424,979 A | 1/1984 | Takagi |
| 4,434,867 A | 3/1984 | Grinde |
| 4,437,534 A | 3/1984 | Grinde |
| 4,442,913 A | 4/1984 | Grinde |
| 4,449,602 A | 5/1984 | Dittmann, Jr. |
| 4,502,560 A | 3/1985 | Hisatomi |
| 4,509,766 A | 4/1985 | Yasui et al. |
| 4,526,249 A | 7/1985 | Parker |
| 4,613,006 A | 9/1986 | Moss et al. |
| 4,768,794 A | 9/1988 | Bibollet |
| 4,804,198 A | 2/1989 | Mai et al. |
| 4,984,648 A | 1/1991 | Strzok |
| 5,064,208 A | 11/1991 | Bibollet |
| 5,145,195 A | 9/1992 | Campbell et al. |
| 5,145,201 A | 9/1992 | Metheny |
| 5,203,424 A | 4/1993 | Gogo et al. |
| 5,370,198 A | 12/1994 | Karpik |
| 5,474,146 A | 12/1995 | Yoshioka et al. |
| 5,586,614 A | 12/1996 | Kouchi et al. |
| 5,727,643 A | 3/1998 | Kawano et al. |
| 5,871,225 A | 2/1999 | Sutherland |
| 5,904,217 A | 5/1999 | Yamamoto et al. |
| 6,012,728 A | 1/2000 | Noble |
| 6,017,047 A | 1/2000 | Hoose |
| 6,095,275 A | 8/2000 | Shaw |
| 6,105,979 A | 8/2000 | Desrochers |
| 6,112,840 A | 9/2000 | Forbes |
| 6,234,263 B1 | 5/2001 | Boivin et al. |
| 6,283,254 B1 | 9/2001 | Bibollet |
| 6,302,232 B1 | 10/2001 | Forbes |
| 6,321,864 B1 | 11/2001 | Forbes |
| 6,382,338 B1 | 5/2002 | Forbes |
| 6,416,062 B1 | 7/2002 | Scatchard |
| 6,431,301 B1 | 8/2002 | Forbes |
| 6,446,744 B2 | 9/2002 | Wubbolts et al. |
| 6,505,896 B1 | 1/2003 | Boivin et al. |
| 6,511,079 B1 | 1/2003 | Charles, Sr. |
| 6,626,258 B1 | 9/2003 | Forbes |
| 6,626,441 B1 | 9/2003 | Hanson |
| 6,631,912 B2 | 10/2003 | Metheny |
| 6,663,117 B2 | 12/2003 | Cheney et al. |
| 6,736,414 B2 | 5/2004 | Farrally-Plourde |
| 6,783,133 B1 | 8/2004 | Araujo |
| 6,863,142 B2 | 3/2005 | Corbeil |
| 6,926,108 B1 | 8/2005 | Polakowski et al. |
| 7,017,695 B2 | 3/2006 | Meunier et al. |
| 7,090,229 B2 | 8/2006 | Monsrud et al. |
| 7,182,165 B1 | 2/2007 | Keinath et al. |
| 7,232,130 B2 | 6/2007 | Reeves |
| 7,322,581 B2 | 1/2008 | Leung |
| 7,353,898 B1 | 4/2008 | Bates, Jr. |
| 7,357,201 B2 | 4/2008 | Jordan |
| 7,475,751 B2 | 1/2009 | Pard et al. |
| 7,478,694 B2 | 1/2009 | Abe et al. |
| 7,481,437 B2 | 1/2009 | Musselman |
| 7,500,679 B2 | 3/2009 | Wade |
| 7,533,749 B1 | 5/2009 | Sampson et al. |
| 7,537,221 B2 | 5/2009 | Lasala |
| 7,540,506 B2 | 6/2009 | Cheney et al. |
| 7,594,557 B2 | 9/2009 | Polakowski et al. |
| D612,766 S | 3/2010 | Boivin |
| 7,694,768 B2 | 4/2010 | Giese et al. |
| 7,726,667 B2 | 6/2010 | Ferron |
| 7,745,751 B2 | 6/2010 | Takahashi et al. |
| 7,789,183 B2 | 9/2010 | Sadakuni et al. |
| 7,896,362 B1 | 3/2011 | Scatchard |
| 8,167,073 B2 | 5/2012 | Polakowski et al. |
| 8,403,342 B1 | 3/2013 | Mcdaniel |
| 8,418,792 B2 | 4/2013 | Rivard |
| 8,479,860 B1 * | 7/2013 | Jorgenson ............... B62M 27/02 180/184 |
| 8,739,913 B2 | 6/2014 | Rivard |
| 8,910,738 B2 | 12/2014 | Mangum |
| 9,321,509 B2 | 4/2016 | Beavis |
| 9,505,450 B1 * | 11/2016 | Girouard ................ B62M 11/02 |
| 9,731,746 B2 | 8/2017 | Hodgson et al. |
| 9,751,552 B2 | 9/2017 | Mangum et al. |
| 9,776,654 B2 | 10/2017 | Gentry |
| 9,873,485 B2 | 1/2018 | Mangum et al. |
| 9,988,067 B1 | 6/2018 | Mangum et al. |
| 10,202,169 B2 | 2/2019 | Mangum et al. |
| 10,232,910 B2 | 3/2019 | Mangum et al. |
| 10,479,448 B2 | 11/2019 | Tapio |
| 10,538,262 B2 | 1/2020 | Mangum et al. |
| 10,773,774 B2 | 9/2020 | Mangum et al. |
| 2002/0017765 A1 | 2/2002 | Mallette et al. |
| 2002/0041080 A1 | 4/2002 | Moriyama et al. |
| 2002/0140000 A1 | 10/2002 | Watanabe |
| 2002/0153186 A1 | 10/2002 | Lemieux |
| 2002/0158441 A1 | 10/2002 | Essinger |
| 2003/0024751 A1 | 2/2003 | Lebreux |
| 2003/0034191 A1 | 2/2003 | Karpik |
| 2003/0159868 A1 | 8/2003 | Alexander |
| 2004/0089193 A1 | 5/2004 | O'Donnell et al. |
| 2004/0124596 A1 | 7/2004 | Cheney et al. |
| 2004/0163857 A1 | 8/2004 | Corbeil |
| 2004/0195024 A1 | 10/2004 | Takahiko et al. |
| 2005/0017465 A1 | 1/2005 | Bergstrom |
| 2005/0183899 A1 | 8/2005 | Polakowski et al. |
| 2006/0232028 A1 | 10/2006 | Pard et al. |
| 2008/0017431 A1 | 1/2008 | Sadakuni et al. |
| 2008/0029324 A1 | 2/2008 | Plankenhorn |
| 2009/0230641 A1 | 9/2009 | Eugenio |
| 2009/0321167 A1 | 12/2009 | Simmons |
| 2011/0253468 A1 | 10/2011 | Rivard |
| 2011/0266077 A1 | 11/2011 | Nadeau |
| 2012/0205173 A1 | 8/2012 | Mallette et al. |
| 2012/0222908 A1 | 9/2012 | Mangum |
| 2012/0247852 A1 | 10/2012 | Fecteau et al. |
| 2013/0032417 A1 | 2/2013 | Sampson |
| 2013/0221628 A1 | 8/2013 | Rivard |
| 2013/0313794 A1 | 11/2013 | Bach et al. |

(56) References Cited

U.S. PATENT DOCUMENTS

| | | |
|---|---|---|
| 2014/0035255 A1 | 2/2014 | Erickson |
| 2015/0144412 A1 | 5/2015 | Mangum |
| 2015/0166143 A1 | 6/2015 | Beavis |
| 2015/0251727 A1 | 9/2015 | Thibault et al. |
| 2015/0259032 A1 | 9/2015 | Mangum |
| 2016/0031471 A1 | 2/2016 | Anderson et al. |
| 2016/0167722 A1 | 6/2016 | Anderson et al. |
| 2016/0280331 A1 | 9/2016 | Mangum |
| 2017/0066502 A1 | 3/2017 | Will et al. |
| 2017/0129570 A1 | 5/2017 | Mangum et al. |
| 2017/0259877 A1 | 9/2017 | Thompson et al. |
| 2018/0244326 A1 | 8/2018 | Zuchoski |
| 2018/0251168 A1 | 9/2018 | Mangum et al. |
| 2018/0257690 A1 | 9/2018 | Mangum et al. |
| 2018/0273142 A1 | 9/2018 | Mangum et al. |
| 2019/0084643 A1 | 3/2019 | Thompson et al. |
| 2019/0168844 A1 | 6/2019 | Mangum et al. |
| 2020/0140000 A1 | 5/2020 | Mangum et al. |
| 2021/0053653 A1 | 2/2021 | Mangum |
| 2021/0086849 A1 | 3/2021 | Mangum |
| 2023/0032075 A1 | 2/2023 | Mangum et al. |

FOREIGN PATENT DOCUMENTS

| | | | |
|---|---|---|---|
| CA | 2555039 | | 9/1999 |
| CA | 2555108 | | 9/1999 |
| CA | 2561337 | | 9/1999 |
| CA | 2345490 A1 | | 10/2001 |
| CA | 2811026 A1 | | 3/2012 |
| CA | 2885569 A1 | | 9/2015 |
| CA | 2887975 A1 | | 9/2016 |
| CA | 2995818 A1 | | 8/2018 |
| CA | 2996760 A1 | | 9/2018 |
| CA | 2998616 A1 | | 9/2018 |
| DE | 69908558 | | 4/2004 |
| DE | 69922609 | | 12/2005 |
| DE | 202006017459 U1 | | 6/2007 |
| EP | 0391282 A2 | | 10/1990 |
| EP | 1056639 | | 12/2000 |
| EP | 0994016 B1 | | 12/2004 |
| EP | 1826423 A2 * | 8/2007 | .............. F02D 11/04 |
| JP | 61-222877 A | | 10/1986 |
| JP | 2001-153168 A | | 6/2001 |
| WO | 99/43540 | | 9/1999 |
| WO | 2017/079503 A1 | | 5/2017 |
| WO | 2019/147162 A1 | | 8/2019 |

OTHER PUBLICATIONS

Examination Report issued by the Canadian Patent Office, dated Dec. 13, 2018, for Canadian Patent Application No. 2,998,616; 3 pages.

Examination Search Report issued by the Canadian Patent Office, dated Dec. 14, 2018, for Canadian Patent Application No. 2,996,760; 3 pages.

International Preliminary Report on Patentability issued by European Patent Office, dated Jan. 26, 2018, for International Patent Application No. PCT/US2016/060441; 27 pages.

International Search Report and Written Opinion of the International Searching Anthority, dated Apr. 18, 2017, for related International Patent Application No. PCT/US2016/060441; 24 pages.

Office Action issued by the Canadian Intellectual Property Office, dated Apr. 10, 2019, for Canadian Patent Application No. 3,003,473; 4 pages.

Office Action issued by the Canadian Intellectual Property Office, dated Aug. 27, 2019, for Canadian Patent Application No. 2,996,760; 3 pages.

Office Action issued by the Canadian Intellectual Property Office, dated Oct. 4, 2019, for Canadian Patent Application No. 2,998,616; 5 pages.

Photo of sno-brute 440 C Competition Model, snowmobile available at least as early as 1974, last accessed Sep. 30, 2020.

Photo of Trail-Rider slide suspension, snowmobile available at least as early as 1974, last accessed Sep. 30, 2020.

Photot of "Suddenly . . . the advanced Allouette" available from Aloutte Recreational Products Ltd., 1 pg, snowmobile vailable at least as early as 1974, last accessed Sep. 30, 2020.

SnoWest Snowmobile Forum, View Single Post-380 mountain mini, Jan. 11, 2017, available at http://snowest.com/forum/showpost.php?p=4009975&postcount=61; 4 pages.

Technical Preview, SnowTech, Crazy Mountain Xtreme Bike Kit, Sep. 2015; 3 pages.

Time Machines Facebook post, 1 pg, snowmobile available at least as early as 1974, last accessed Sep. 30, 2020.

Stefanson, Valdi, "Redline Snowmobiles—The Rest of the Story", available at https://www.snowtechmagazine.com/redline-snowmobiles-the-rest-of-the-story, dated Jan. 12, 2021; 16 pages.

ffice Action as issued by the Canadian Intellectual Property Office, dated Mar. 20, 2023, for Canadian Patent Application No. 3,121,977; 3 pages.

* cited by examiner

SNOW VEHICLE

The present application is a continuation of U.S. patent application Ser. No. 15/927,628, filed Mar. 21, 2018, which claims priority from U.S. Provisional Patent Application Ser. No. 62/474,876 filed Mar. 22, 2017, the subject matter of which are incorporated herein by reference.

BACKGROUND

The present disclosure relates to snow vehicles including snowmobiles and or snow bikes.

Many types of vehicles are configured with tracks to drive in the snow. Regardless of whether the vehicle is a snowmobile or a wheeled vehicle converted to a tracked vehicle, tracked vehicles typically include a drive shaft mounted to a suspension system that supports the endless track. The drive shaft typically includes drive sprockets that engage the endless track. In the case of snow bikes, it is known to convert a motor bike by removing the front tire and replacing it with a ski, and by removing the rear tire and replacing it with a rear suspension having a drive belt.

One such snow vehicle is shown in our U.S. Pat. No. 8,910,738, the subject matter of which is incorporated herein by reference. This patent discloses a conversion of a motorbike into a snow vehicle where the motorbike powertrain is utilized to power the track of the converted snow vehicle. Other such snow bikes are known from US patent applications, namely: Publications 2015/0144412; 2015/0259032; 2016/0280331 and application Ser. Nos. 14/935,224; 14/935,265 and 15/165,862; the subject matter of which are incorporated herein by reference.

SUMMARY

In one embodiment, a snow vehicle comprises a vehicle frame, the frame having an engine compartment having sidewalls; a powertrain comprising an engine coupled to a transmission, the powertrain being housed between the sidewalls; the transmission comprising a driveshaft protruding through one of the sidewalls; a drive coupler attached to the driveshaft and positioned on an opposite side of the one sidewall as said powertrain; a rear suspension; a drive belt coupled to the rear suspension; a propulsion driven member supported by the frame and coupled to the belt, the propulsion driven member rotating about a belt drive axis; a driven coupler positioned adjacent to the drive coupler and coupled to the propulsion driven member; and a linear element coupling the drive coupler and the driven coupler to drive the drive belt.

In another embodiment, a snow vehicle comprises a vehicle frame; a powertrain comprising an engine coupled to a transmission, the transmission comprising a driveshaft; a drive coupler attached to the driveshaft; a rear suspension; a drive belt coupled to the rear suspension; a propulsion driven member supported by the frame and coupled to the belt, the propulsion driven member rotating about a belt drive axis; and operator foot supports, wherein the belt drive axis is forward of the foot supports by a distance $X_1$. $X_1$ is approximately 5 inches.

In yet another embodiment, a snow vehicle, comprises a vehicle frame; a powertrain comprising an engine coupled to a transmission, the transmission comprising a driveshaft; a drive coupler attached to the driveshaft; a rear suspension comprising a front control arm coupled to the vehicle frame, where a front end of the front control arm is coupled at a control arm rotational axis; a drive belt coupled to the rear suspension; a propulsion driven member supported by the frame and coupled to the belt, the propulsion driven member rotating about a belt drive axis; wherein the control arm rotational axis is within a distance $X_3$ of belt drive axis, wherein $X_3$ is in a range of 2 inches to 10 inches.

BRIEF DESCRIPTION OF THE DRAWINGS

The invention will now be described in relation to the drawing figures where.

DETAILED DESCRIPTION OF THE EMBODIMENTS

Figure 1:
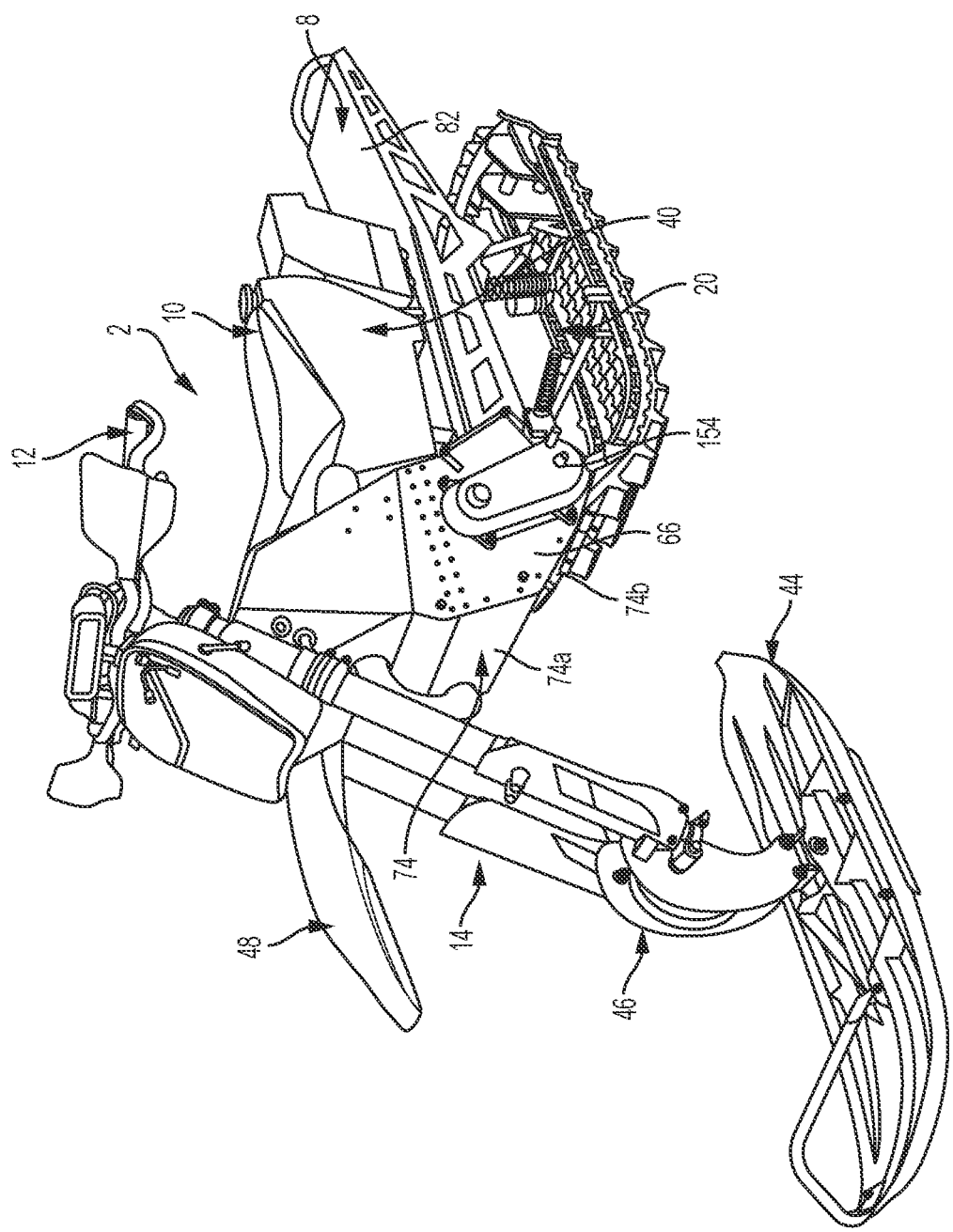
FIG. 1 is a left front perspective view of the snow vehicle as disclosed in the present disclosure.
Figure 2:
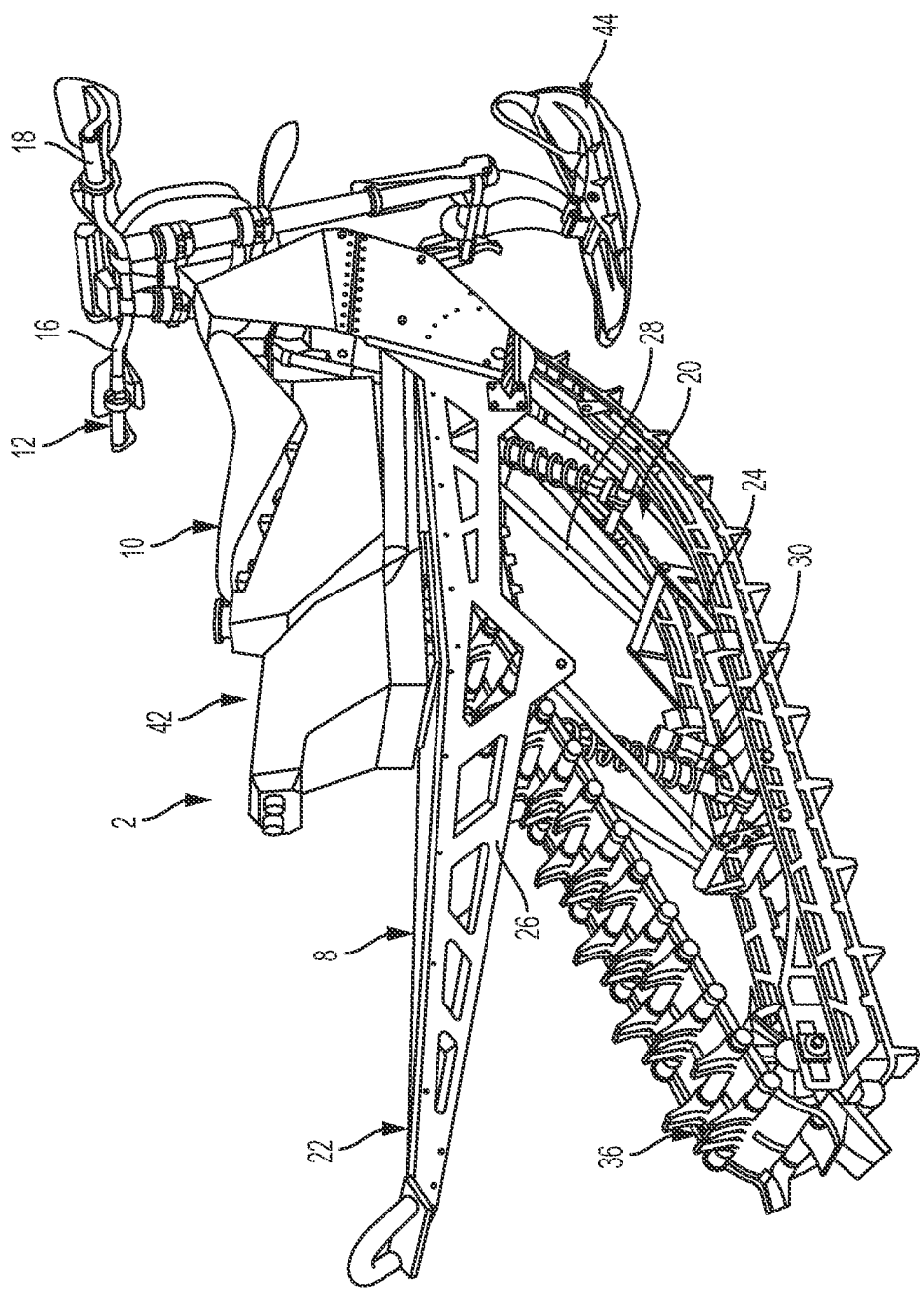
FIG. 2 is a right rear perspective view of the snow vehicle as disclosed in the present disclosure.

With reference first to FIGS. 1-6, a snow vehicle is shown generally at 2 having a propulsion unit 6 (see FIG. 10), which is shown as a motorcycle engine, a frame 8, an operators seat 10, and a steering assembly 12 which includes a front fork 14. Steering assembly 12 includes handlebars 16 having handgrips 18 (FIG. 2). A rear suspension assembly 20 is shown having an upper frame portion 22 (FIG. 2) in the form of a tunnel, slide rails 24, side panels 26 (FIG. 3), control arms 28, 30, linear force elements 32 and 34 and an endless belt or drive track 36.

Figure 3:
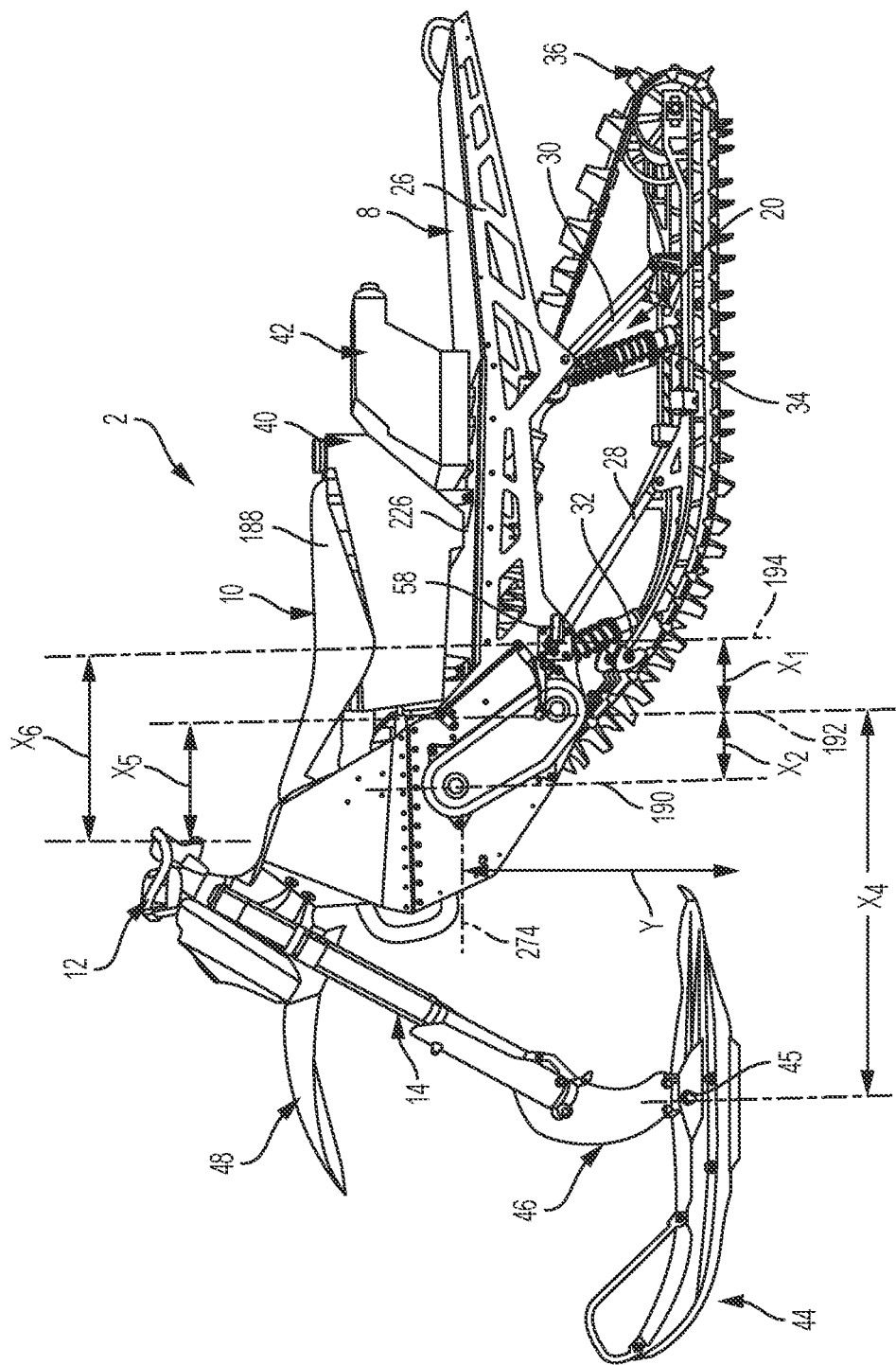
FIG. 3 shows a left side view of the snow vehicle as disclosed in the present disclosure.
Figure 5:
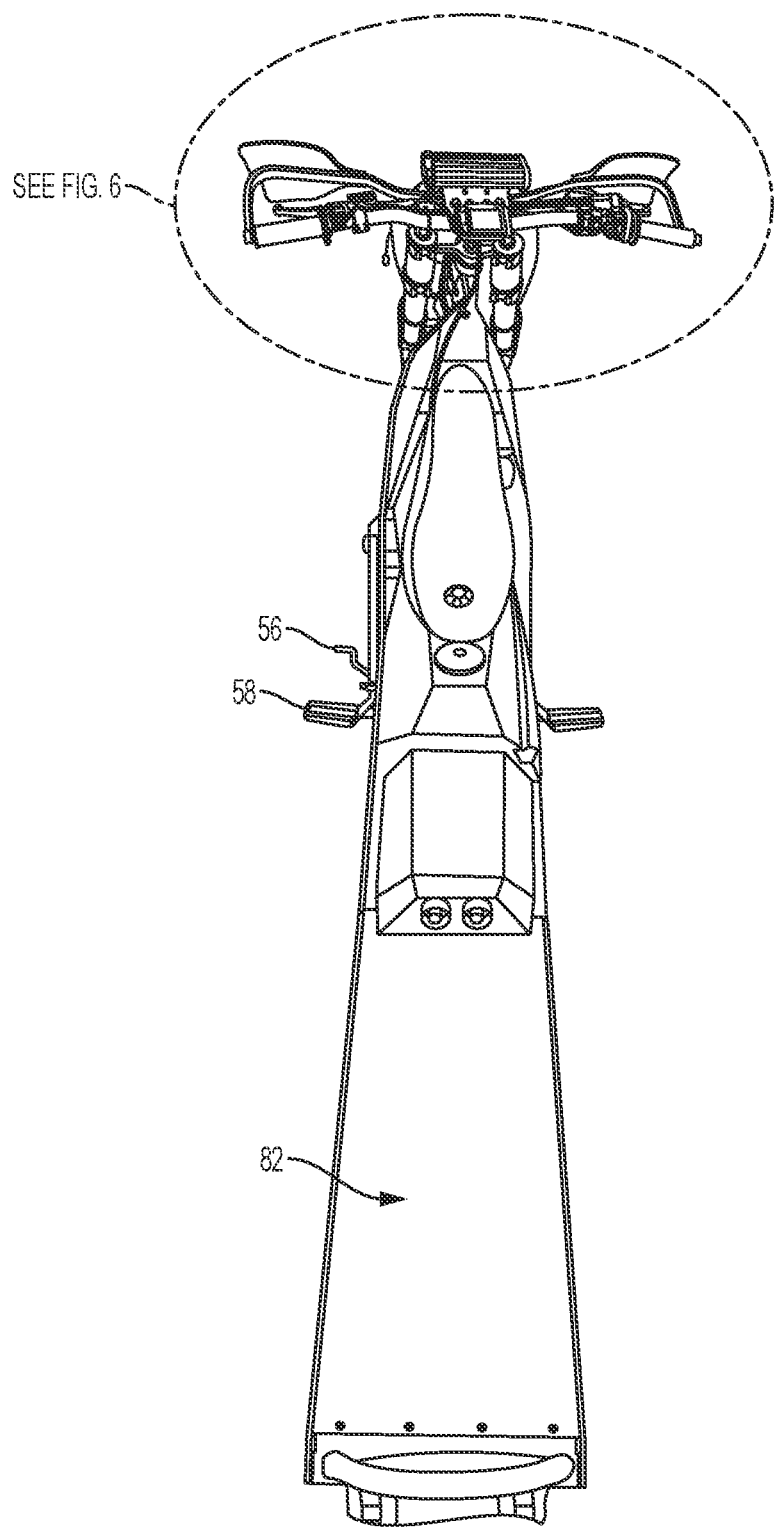
FIG. 5 shows a rear view of the snow vehicle as disclosed in the present disclosure.
Figure 6:
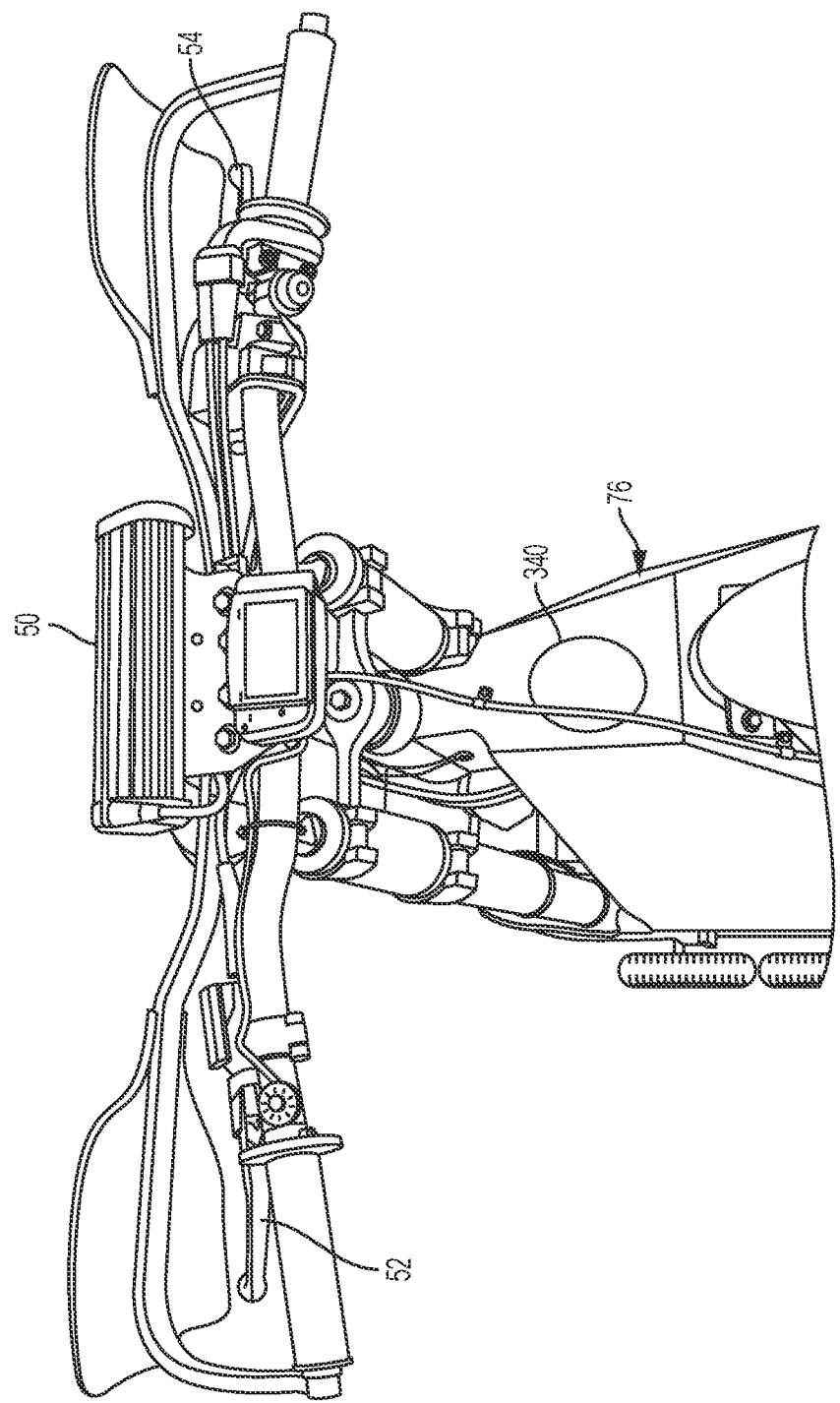
FIG. 6 is an enlarged portion of the area denoted in FIG. 5.

Other aspects of the snow bike include a fuel tank 40 positioned under the seat 10 and a muffler 42 (FIG. 2) positioned rearwardly of the seat 10. As shown in FIG. 3, a ski 44 is coupled to the front fork 14 by way of a ski bolt 45 to spindle 46 for steering snow bike 2 by way of steering assembly 12. A front fender 48 is positioned over the ski 44. With reference to FIGS. 5 and 6, the snow bike 2 further includes a head light 50, hand controls 52 and 54, and a transmission shift linkage 56. Foot supports in the form of pegs 58 are positioned on either side of snow bike for the rider's feet. Unlike the prior art mentioned above, snow bike 2 is a dedicated snow bike meaning that it has not been converted from a dirt bike or motor bike, but rather was designed solely for the function as a snow bike.

With reference now to FIGS. 7-10, frame 8 will be described in greater detail. As shown best in FIG. 7, frame 8 includes side panels 26 which couple to a center section 60 (FIG. 8) having apertures 62 which align with apertures 64 in side panels 26 (FIG. 7) to couple the side panels to the center section 60. Side panels 26 are mirror image for the left and right hand side of the tunnel 22 and include forward panel portions 66. As shown best in FIGS. 10 and 11, forward panel portions 66 define sidewalls of an engine compartment for mounting powertrain 6.

Figure 9:
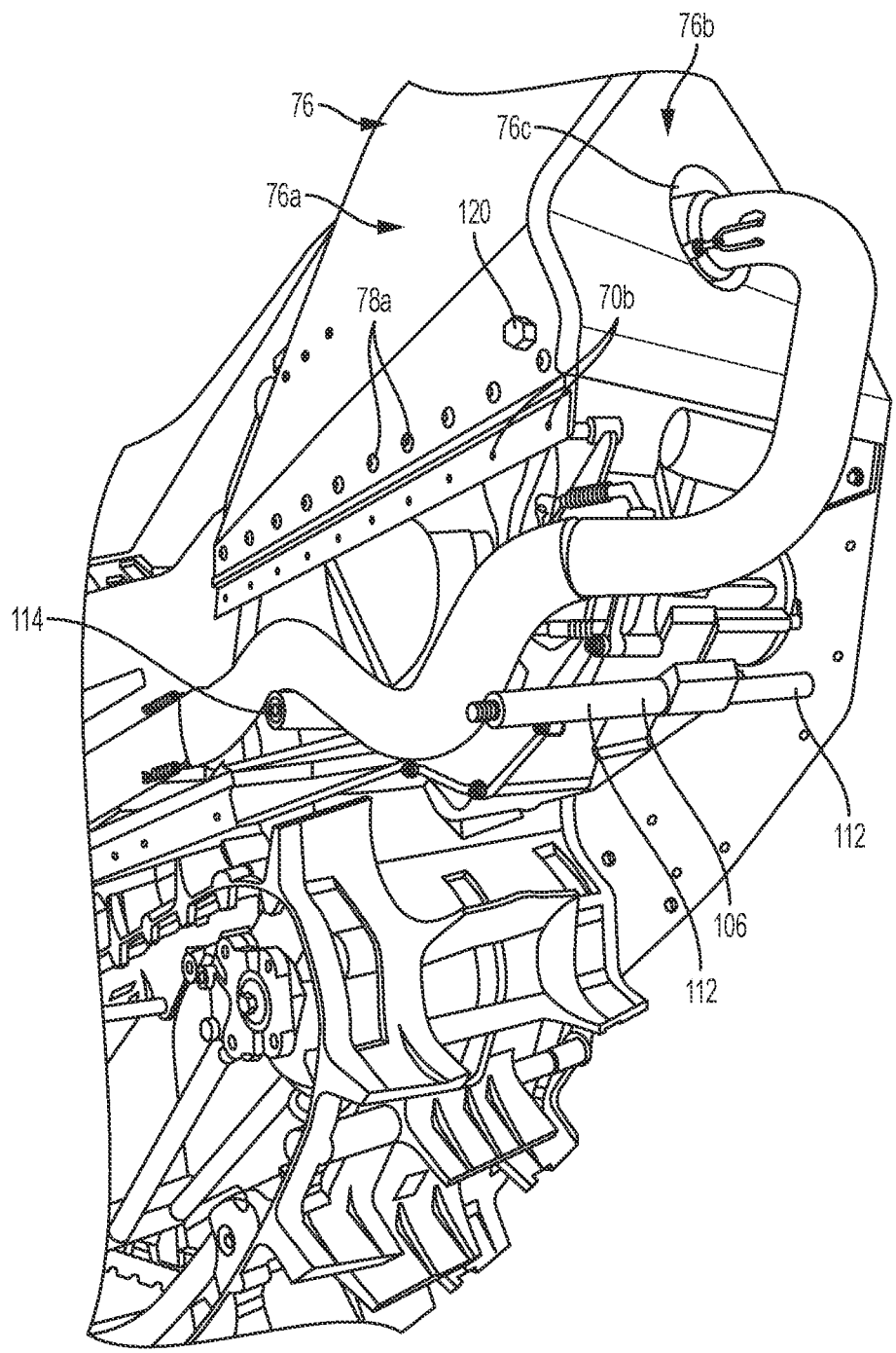
FIG. 9 shows an underside perspective view of the frame shown in FIG. 8.
Figure 13:
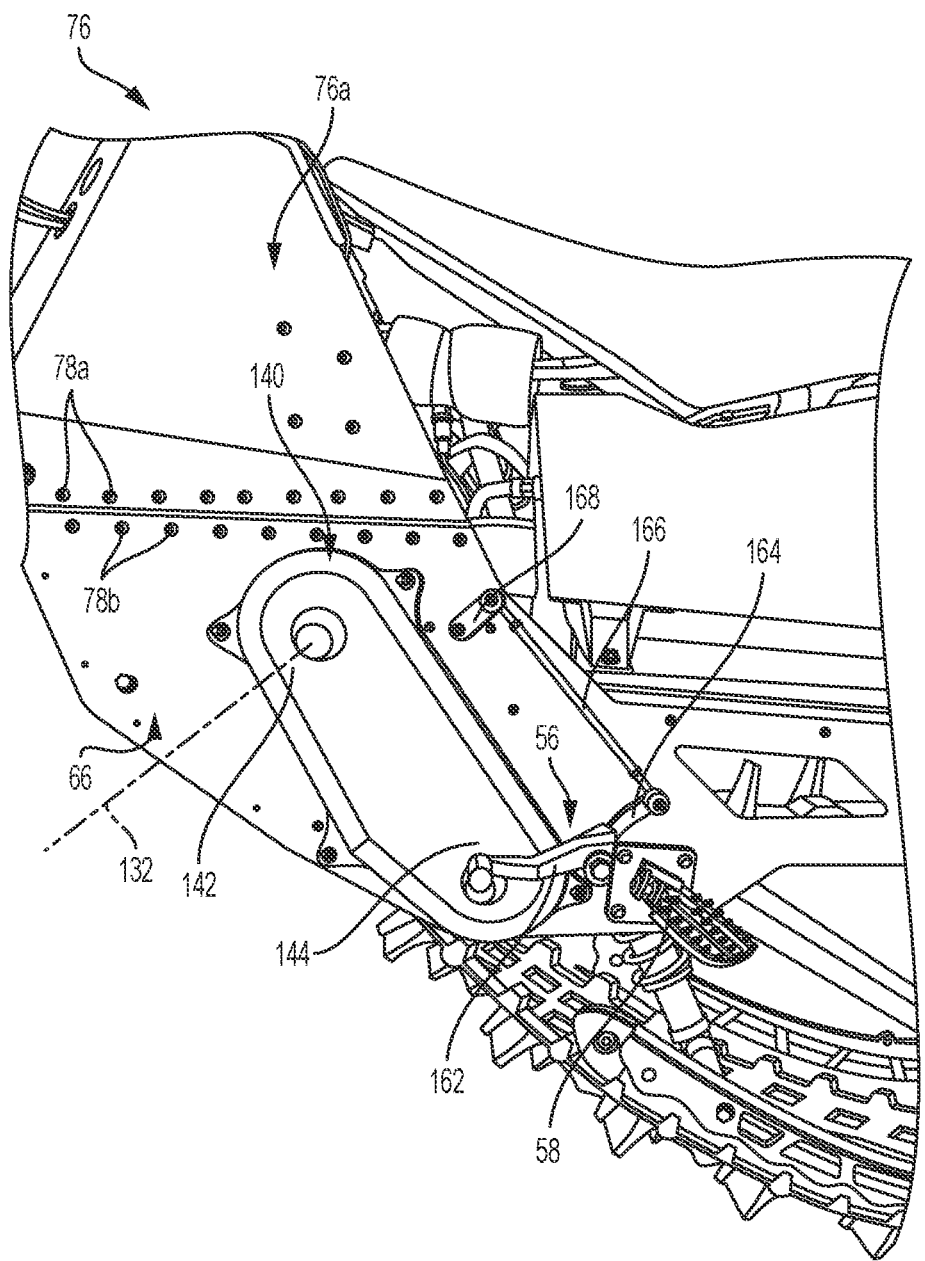
FIG. 13 shows a left hand side view of the vehicle with the chain case installed.
Figure 14:
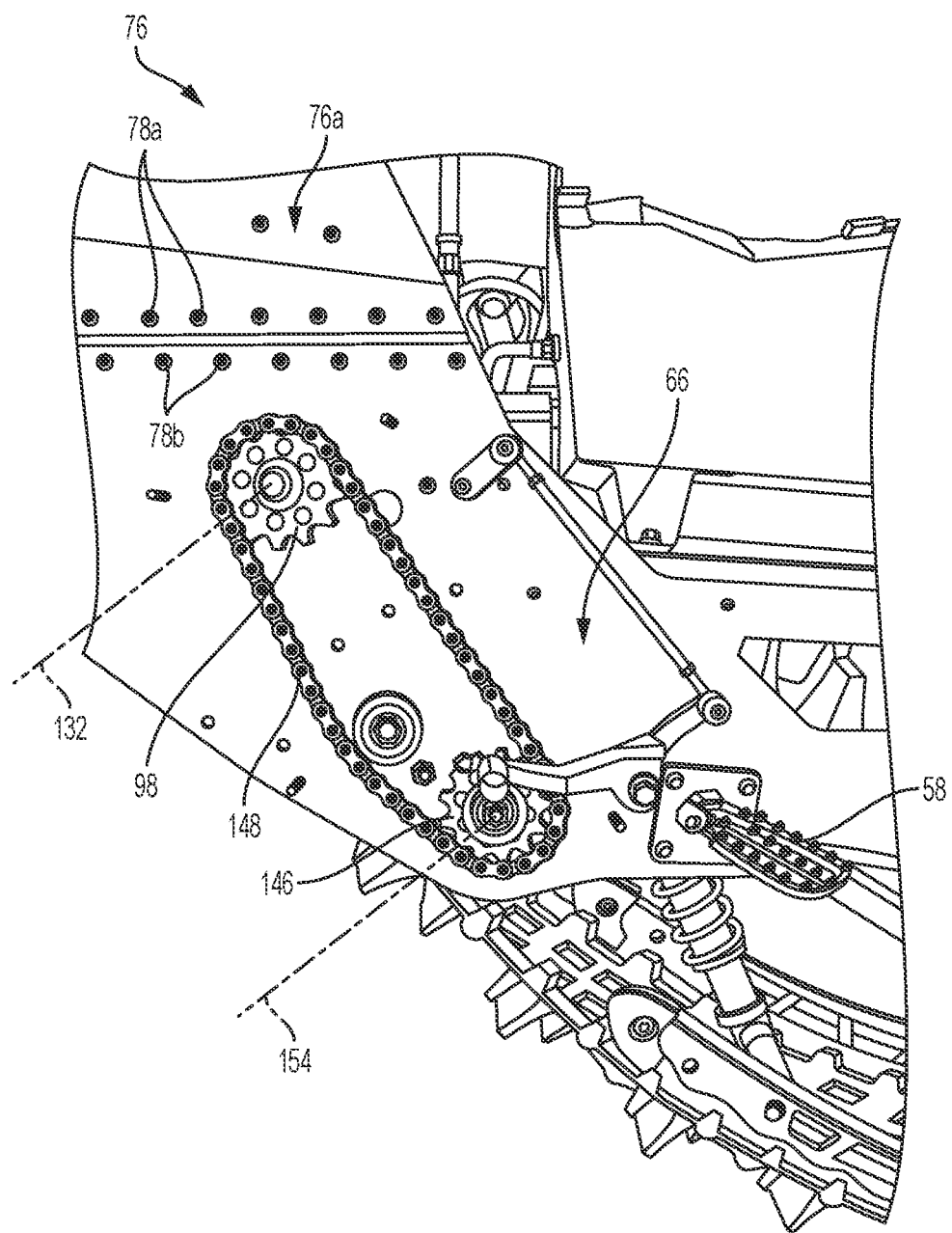
FIG. 14 is similar to FIG. 13 with the chain case removed.
Figure 15:
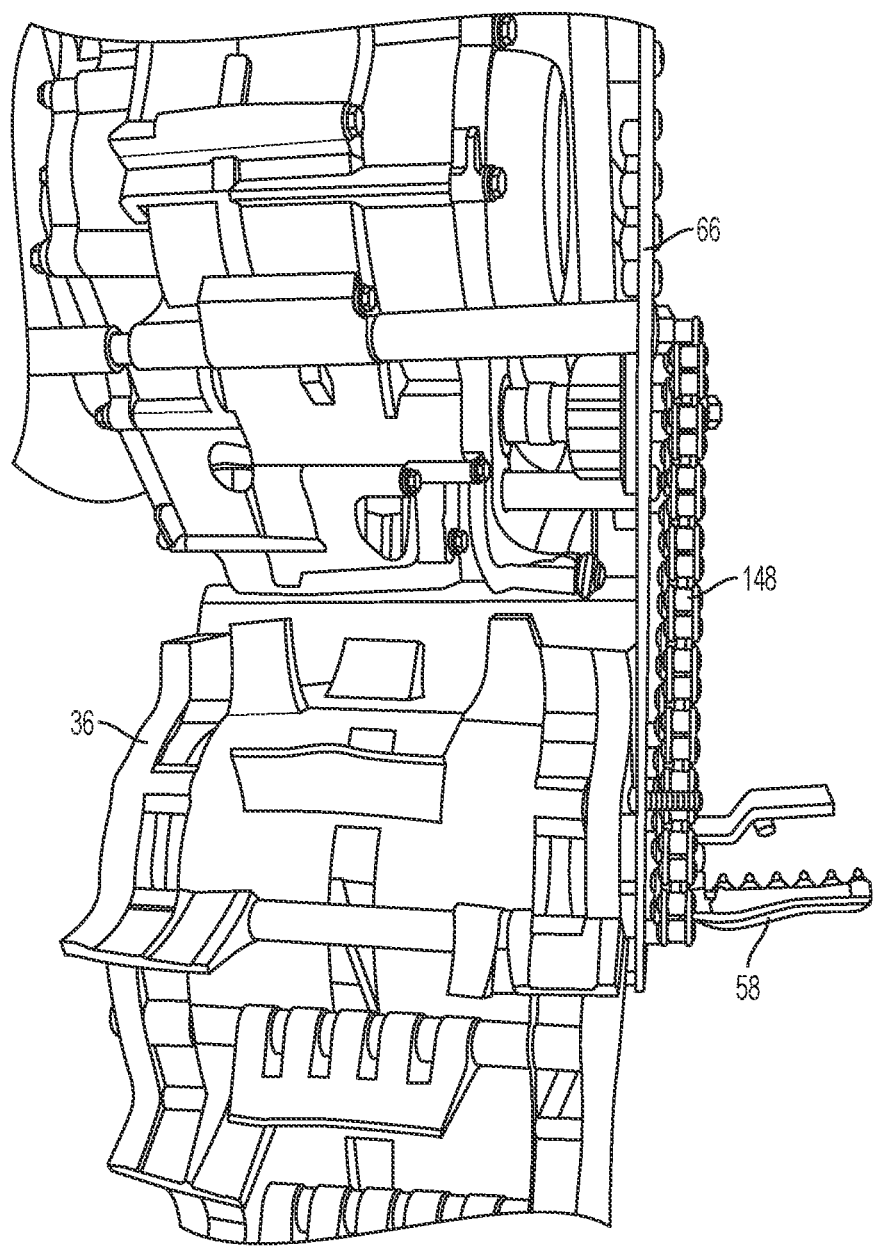
FIG. 15 shows an underside perspective view of the powertrain and belt.
Figure 16:
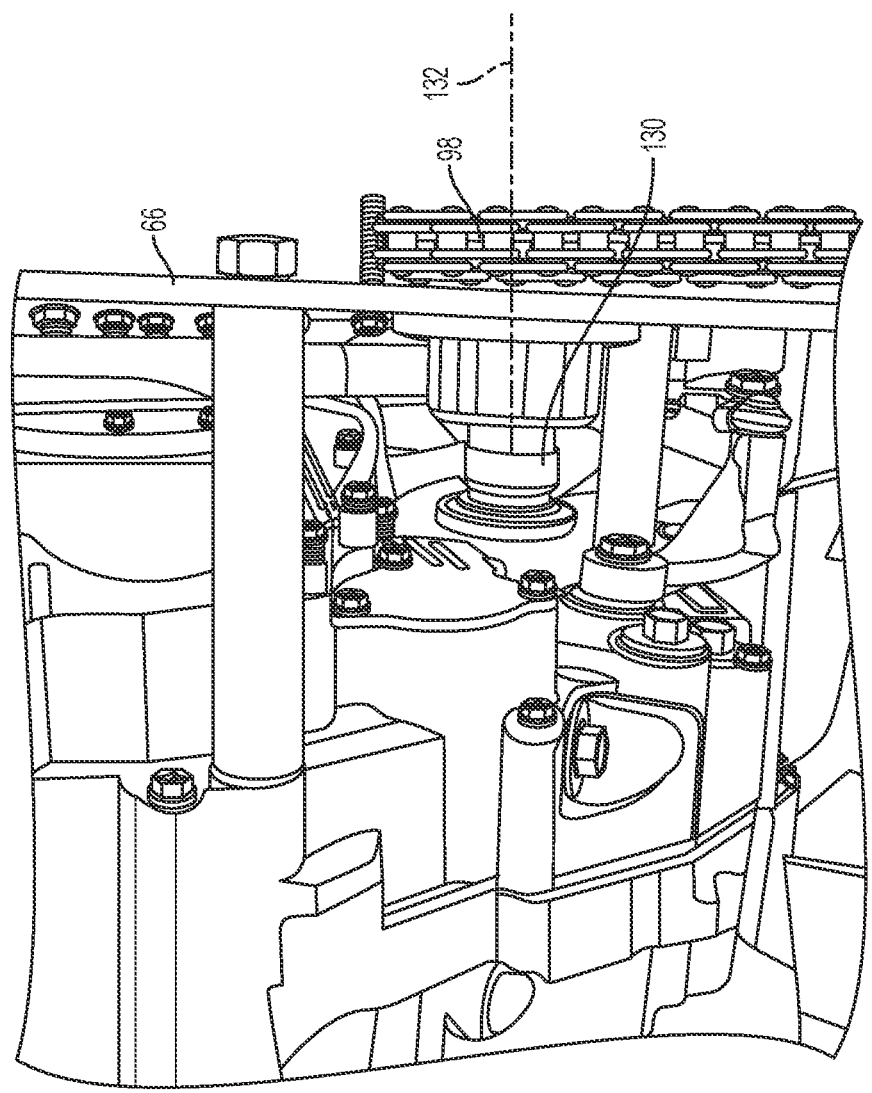
FIG. 16 shows an enlarged perspective view of the powertrain of FIG. 15.
Figure 17:
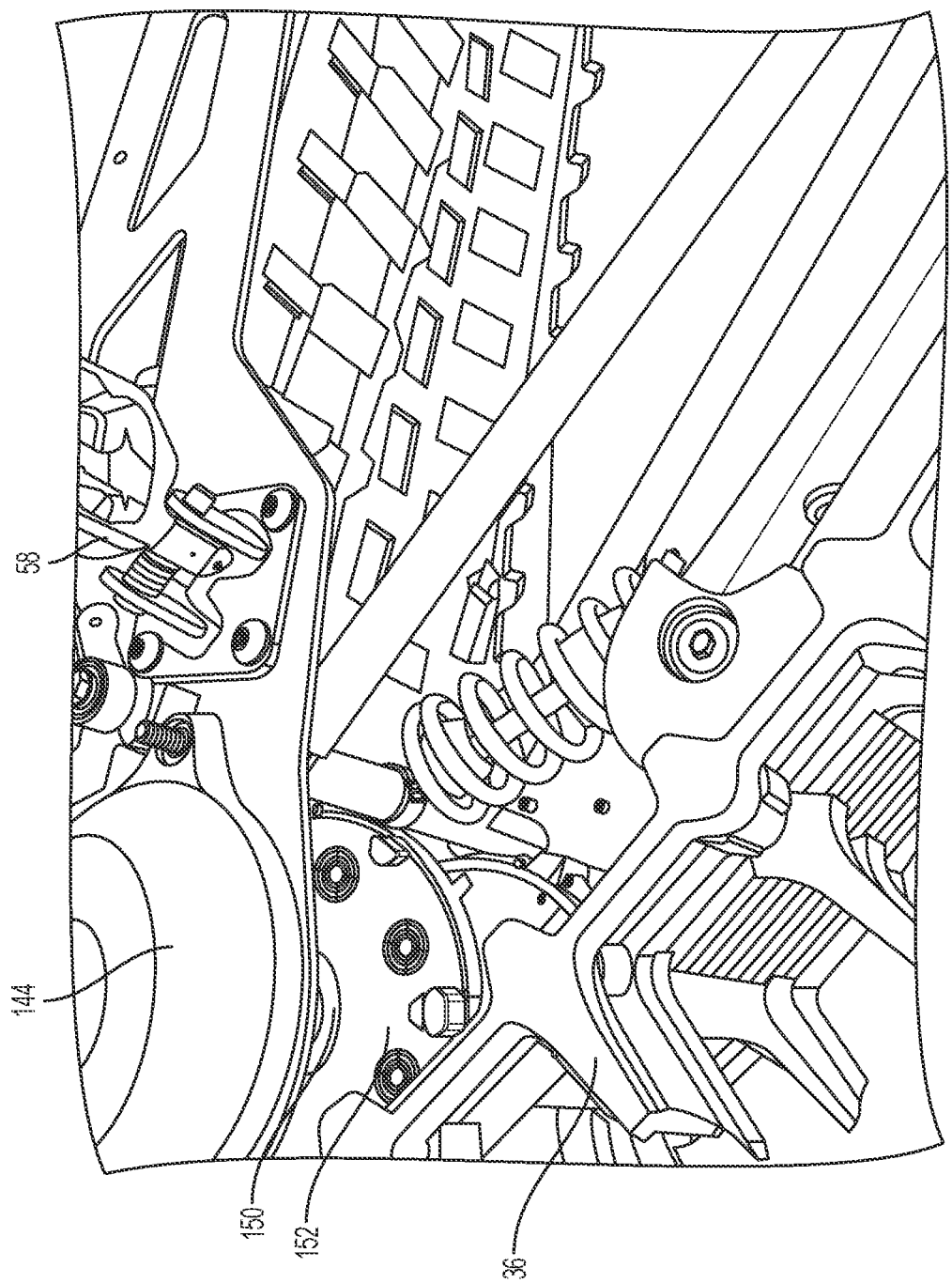
FIG. 17 shows an underside perspective view of the track drive mechanism.

A coupling piece 68 has upper apertures 70a (FIG. 7) and lower apertures 70b (FIG. 9). Side panels 66 couple to a front panel portion 74 (FIG. 1) to form an engine compartment for enclosing the powertrain 6 as described herein. With reference now to FIGS. 9 and 13, an upper cover portion 76 is provided having fasteners 78a coupled to the upper apertures 70a (FIG. 7) and fasteners 78b (FIG. 13) coupled to the lower apertures 70b (FIG. 9). Upper cover portion 76 includes sidewalls 76a and a front wall 76b having an aperture at 76c as described herein. As shown in FIG. 13, powertrain 6 is substantially closed by the side panels 66, front panel 74 (FIG. 1) and upper cover portion 76.

Figure 10:
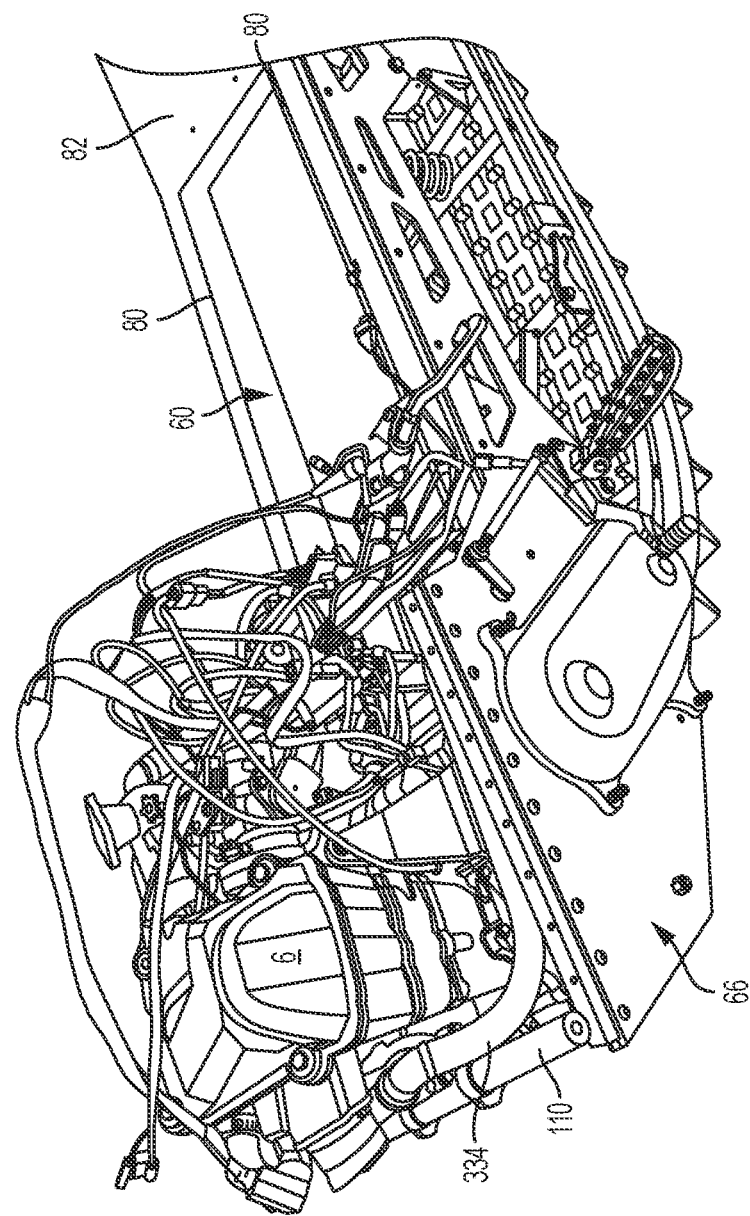
FIG. 10 shows a top left view of the frame with the engine cover removed.

As shown best in FIG. 10, center section 60 includes slots 80 profiled for mounting objects on top of the center portion 60 as described herein. Frame 8 further includes a rear panel 82 which extends rearwardly and over track 36, as best shown in FIGS. 1 and 5. As described further herein, center section 60 is adapted for mounting of the fuel tank 40 and muffler 42 thereto.

Figure 11:
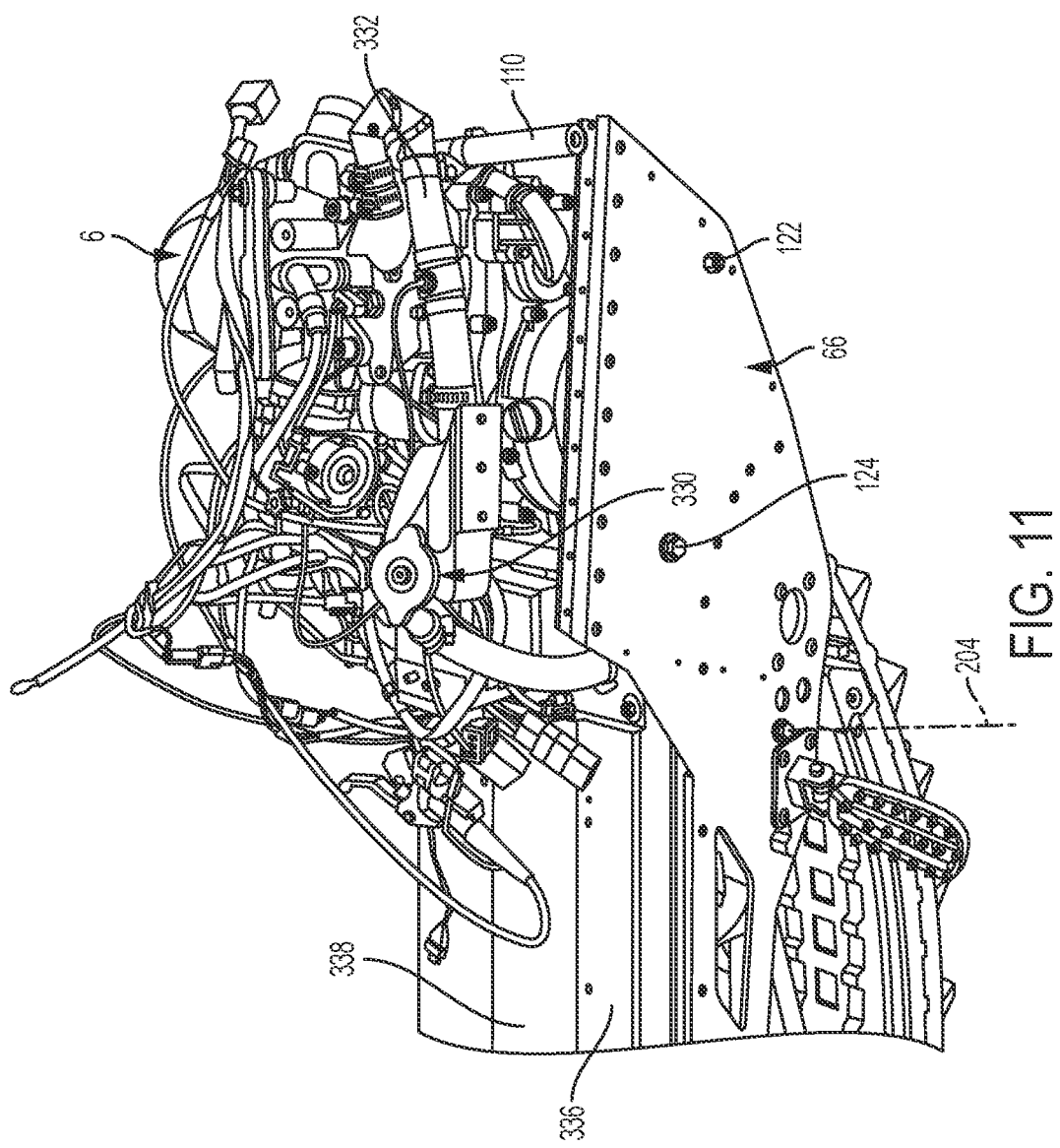
FIG. 11 shows a top right view of the frame with the engine cover removed.
Figure 12:
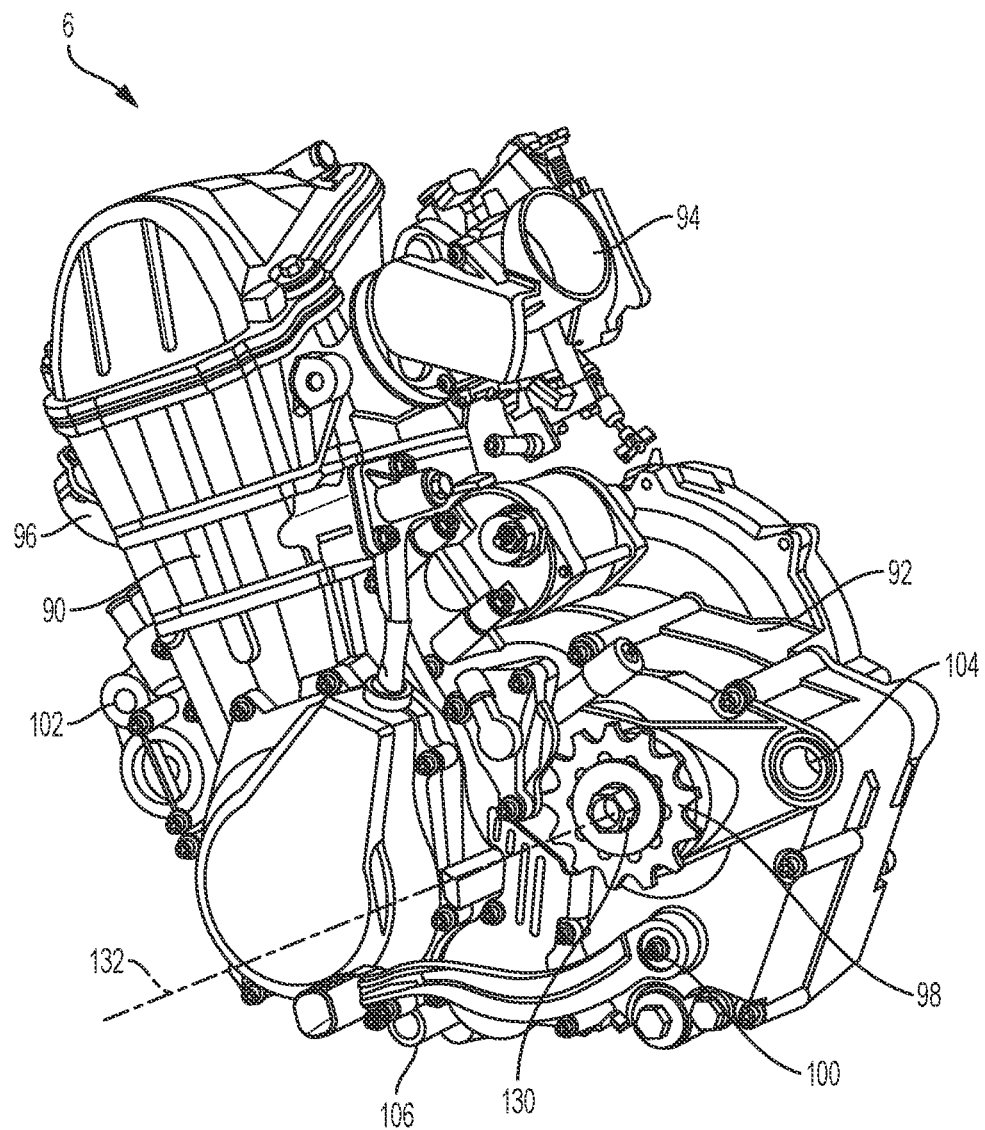
FIG. 12 shows a left hand perspective view of the powertrain.

As shown best in FIG. 12, powertrain 6 includes an engine portion 90 and an integrated transmission portion 92. In the embodiment shown, powertrain 6 is a Husqvarna 450 FC motorcycle engine. Engine 90 includes an air intake system 94 and an engine exhaust system at 96. Transmission portion 92 includes an output sprocket at 98 and a gear shift input shaft at 100. Powertrain 6 includes engine mounts at 102, 104 and 106 (FIG. 12) and extension rods 110 can be coupled to mounts 102 (see FIGS. 10 and 11); extension rods 112 can be coupled to mounts 106 (FIG. 9) and mounts 114 (FIG. 9) can be coupled to mounts 104. A fastener 120 (FIG. 9) can be positioned through upper side panel portion 76a (FIG. 9) and into threaded engagement with extension rod 110; and fasteners 122 and 124 can be coupled to extension rods 112 and 114 respectively through panel portion 66, as best shown in FIG. 11.

Figure 7:
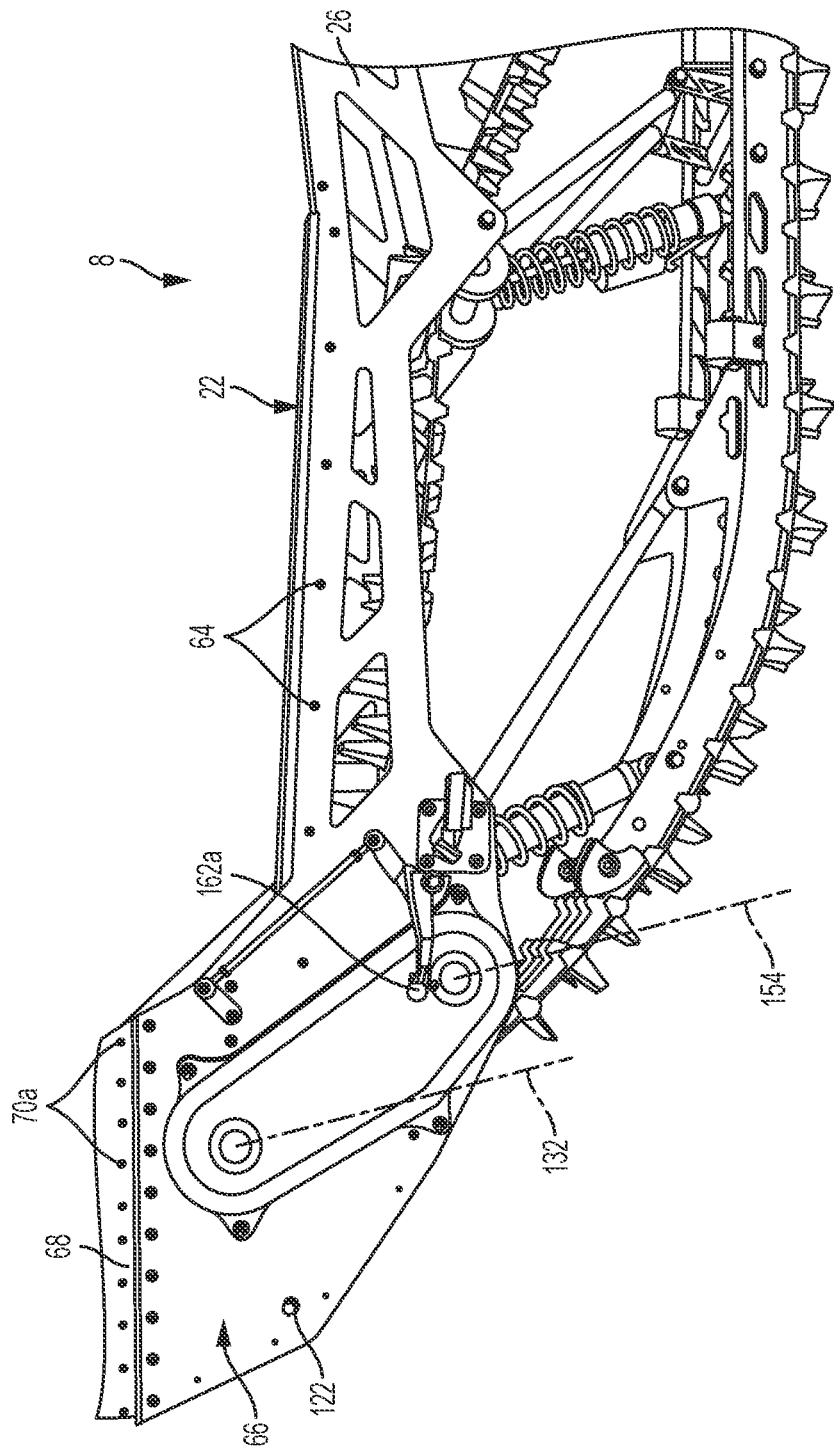
FIG. 7 is an enlarged side view of the left side of the frame.
Figure 8:
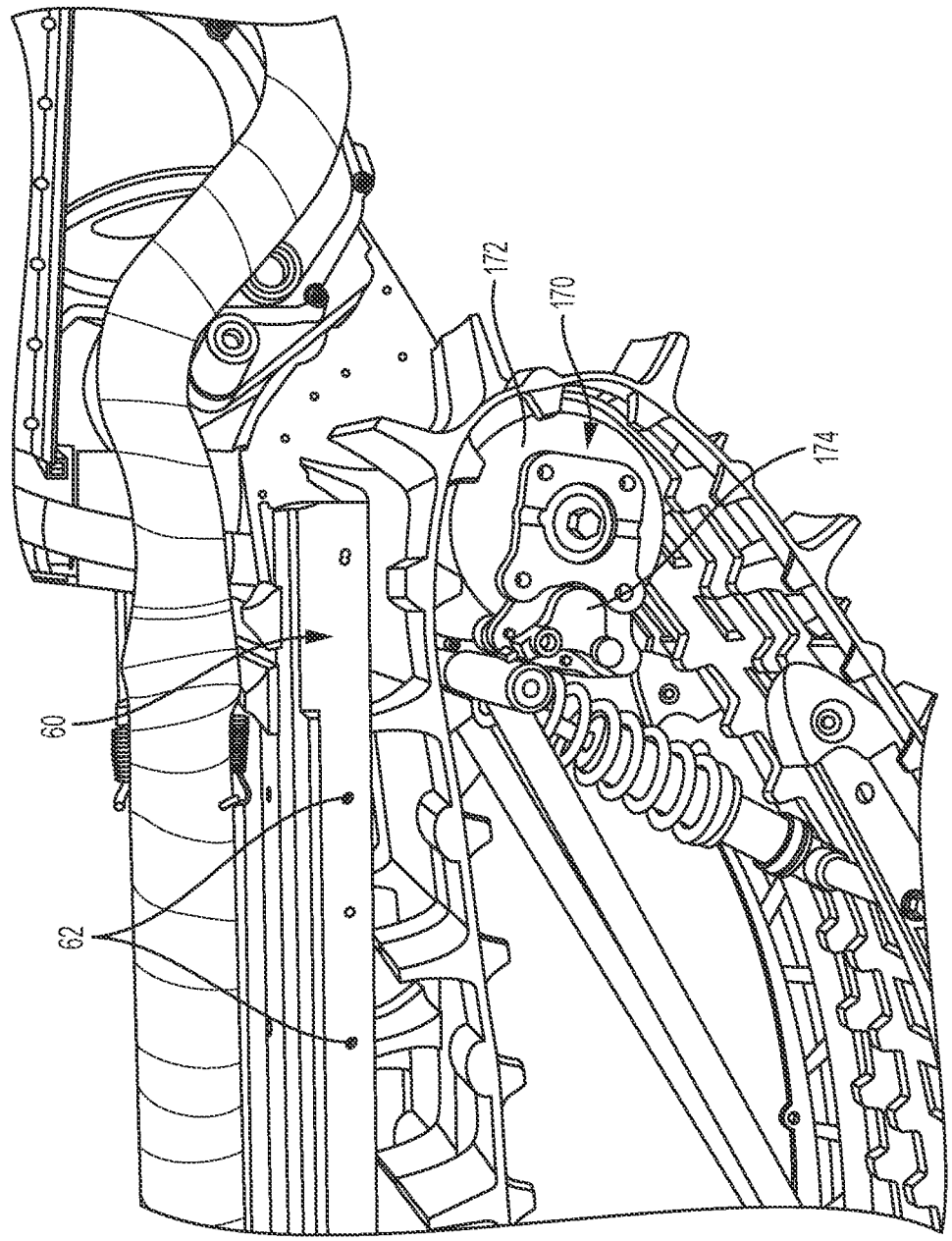
FIG. 8 is an enlarged side view of the right of the frame less the side panels.

With reference now to FIGS. 12-17, the belt drive will be described in greater detail. As shown best in FIGS. 12 and 16, sprocket 98 is mounted to a shaft 130 which rotates about an axis 132. As shown best in FIGS. 13 and 14, snow bike 2 includes a chain case 140 having an upper portion 142 which covers sprocket 98 and a lower portion 144 which covers a sprocket 146 (FIG. 14), as well as a chain 148 which entrains the two sprockets 98, 146. It should be understood that powertrain 6 is positioned in the engine compartment defined by side panels 66 such that shaft 130 protrudes through panel 66 and that sprockets 98, 146 and chain 148 are on the outside of panel 66. Meanwhile, sprocket 146 is positioned in the chain case cover portion 144 and drives the belt drive 150 (FIG. 17) including sprockets 152. Sprockets 152 rotate about longitudinal axis, or belt drive axis 154 (FIG. 7).

As shown best in FIG. 13, transmission shift linkage 56 has a foot treadle at 162 which couples to a link arm 164 which then couples to pull rod 166. Pull rod 166 ultimately couples with link arm 168. Link arm 168 is coupled to shaft 100 (FIG. 12). Foot control 162 includes a treadle portion 162a (FIG. 7) positioned forward of belt drive axis 154. As shaft 130 extends through side panel 66 and is coupled directly to sprocket 152, a jack shaft as is commonly used in snowmobiles is not required for the drive. This increases the mechanical efficiency and reduces the cost of the snow bike 2. Due to the elimination of a jack shaft, and as shown best in FIG. 8, a brake system 170 is shown which is coupled directly to the shaft to which sprocket 152 is coupled. Brake system 170 includes a brake disk 172 and a caliper 174.

With reference now to the powertrain 6 within the frame 8, engine and transmission are forward of a rider's center of gravity (COG) position 188 as shown best in FIG. 3. Three vertical lines are shown in FIG. 3, that is vertical line 190 which extends through transmission drive axis 132 (FIG. 7); vertical line 192 which extends through belt drive axis 154 and vertical line 194 which extends through a front edge of foot pedals 58. As shown, belt drive axis 154 (at line 192) is forward of a front edge of the foot pegs 58 (at line 194) by a distance of $X_1$. This means that the front of the track 36 extends forward of the rider's foot. Furthermore, the transmission drive axis 132 (FIG. 12) at line 190 is forward of line 192 by a distance $X_2$. As shown, $X_1$ is approximately 5 inches, but could be in a range of 2 to 6 inches. As also shown, $X_2$ is approximately 5.5 inches, but could be in a range of 2 to 6 inches.

As shown, due to the forward position of the drive belt axis 154 as disclosed, drive belt 36 has a track length of 146 inches which is substantially longer than those normally available for snow bikes that are converted from dirt bikes. The track could be within a range from 120 to 156 inches. Also the width of track 36 is 11.5 inches and the frame 8 is between 0.5 and 1.5 inches wider than the track.

Figure 4:
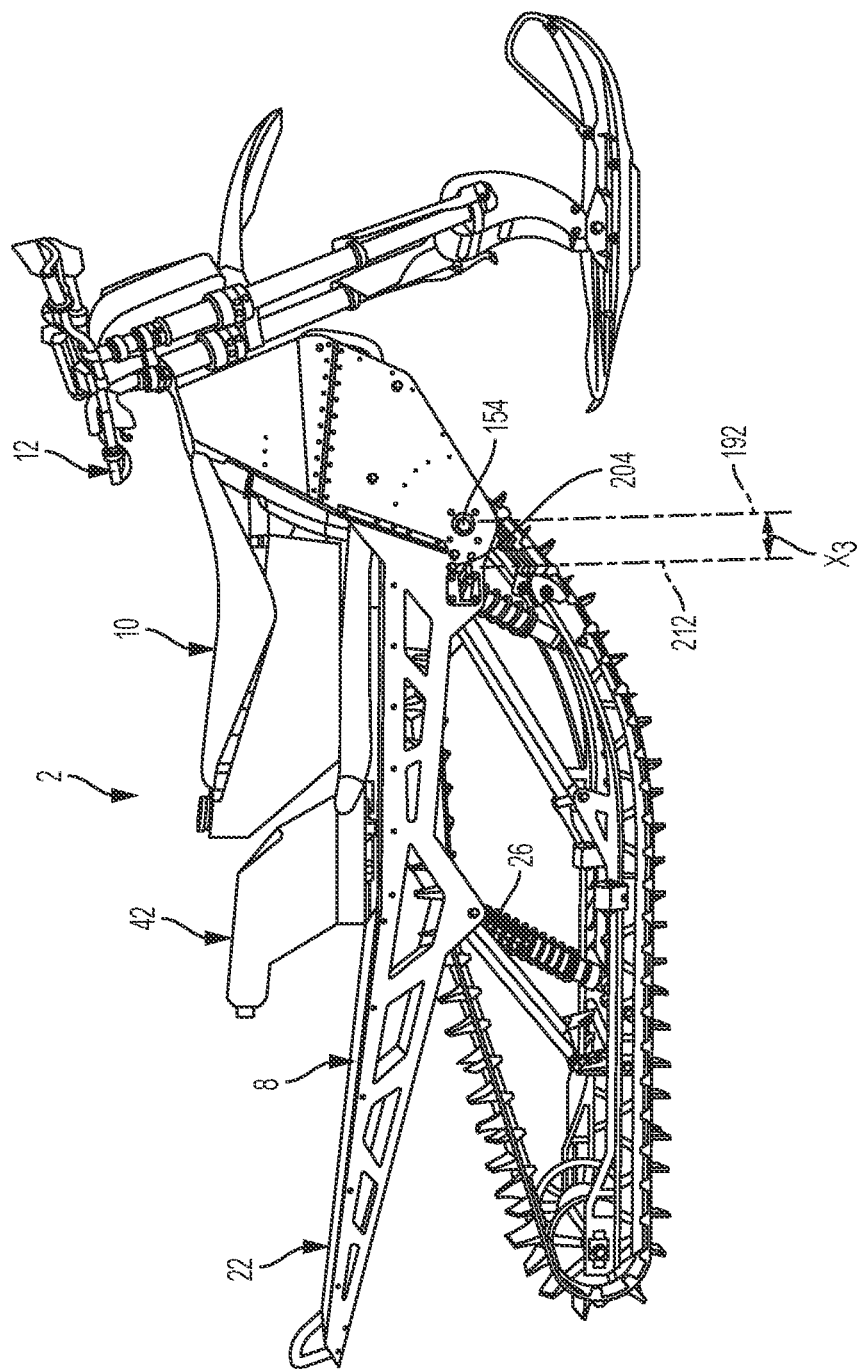
FIG. 4 shows a right side view of the snow vehicle as disclosed in the present disclosure.
Figure 18:
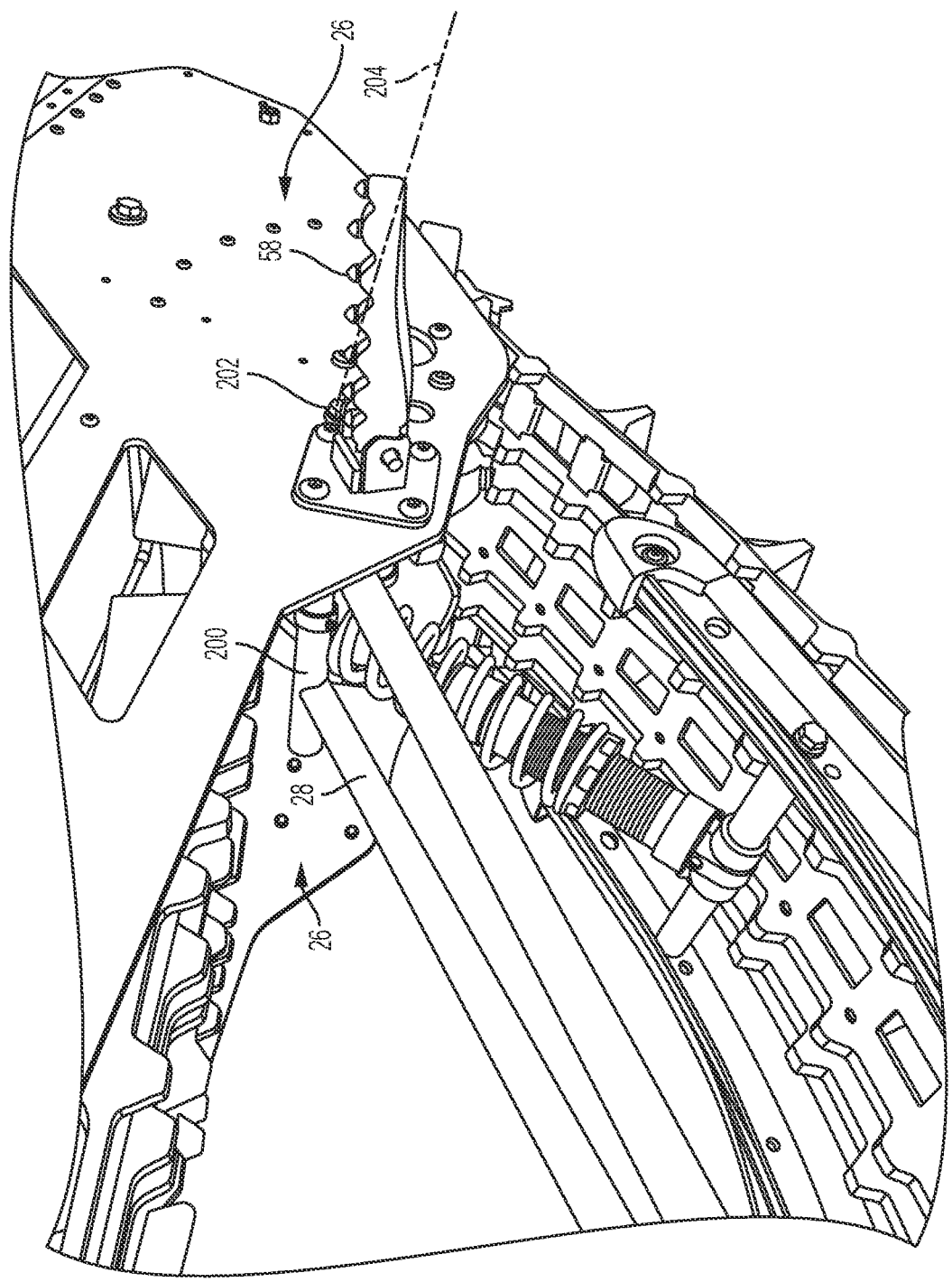
FIG. 18 is a right rear perspective view of the rear suspension.

With reference now to FIG. 18, front control arm 28 is shown having an upper crossbar at 200 which couples to the side panels 26 by way of a fastener 202. Upper rod 200 rotates about a control arm rotational axis 204. As best shown in FIG. 4, a vertical line 212 extends through control arm rotational axis 204. Thus, control arm rotational axis 204 is within a distance $X_3$ of belt drive axis 154 (line 192). In the embodiment shown, $X_3$ is equal to or less than 4 inches, but $X_3$ could be in a range of 2 inches to 10 inches. This means that the distance between the drive axis 154 and the control arm rotational axis 204 is within 4", which allows more vertical travel for the rear suspension 20.

Figure 19:
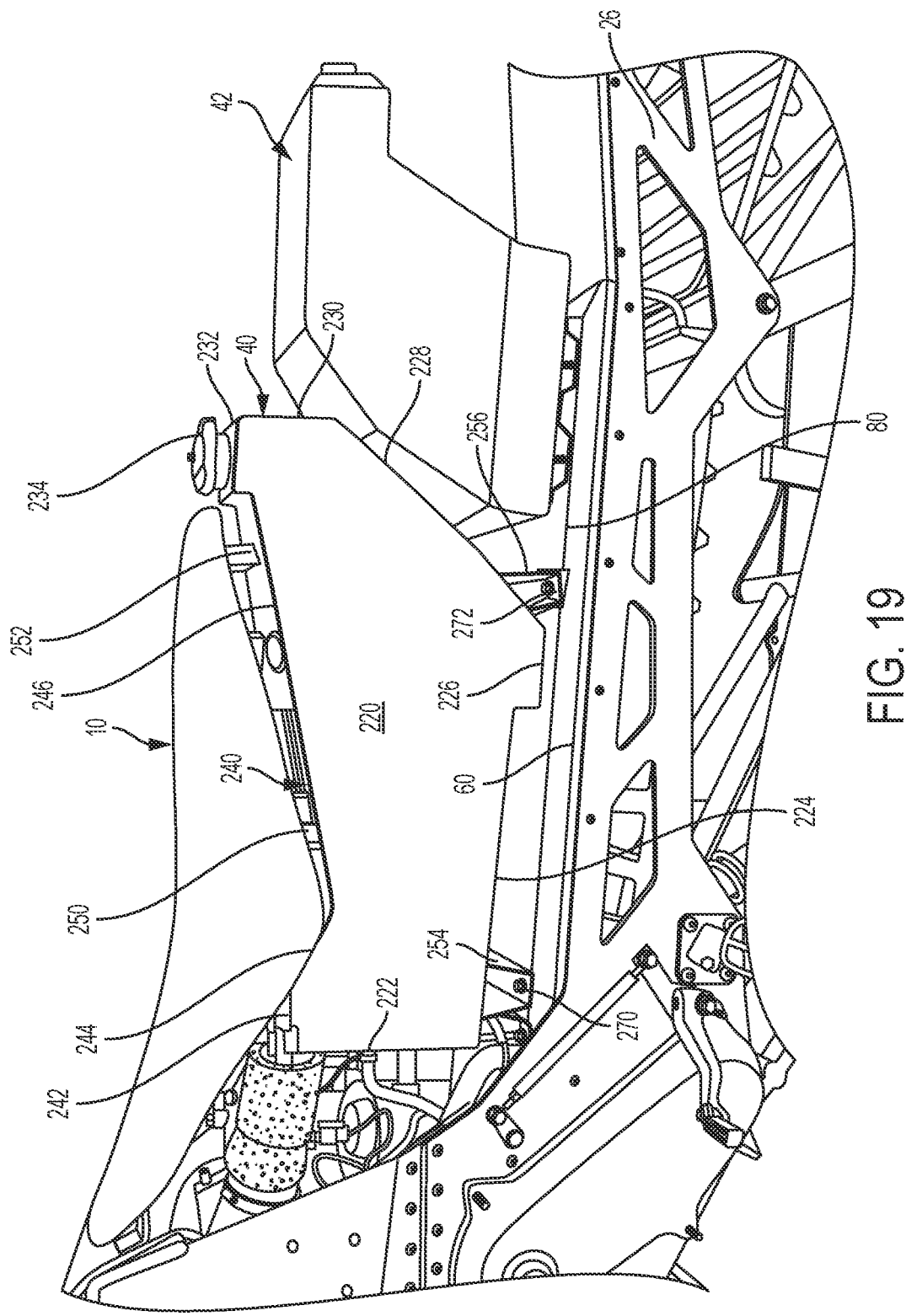
FIG. 19 is a left side view of the fuel tank.
Figure 20:
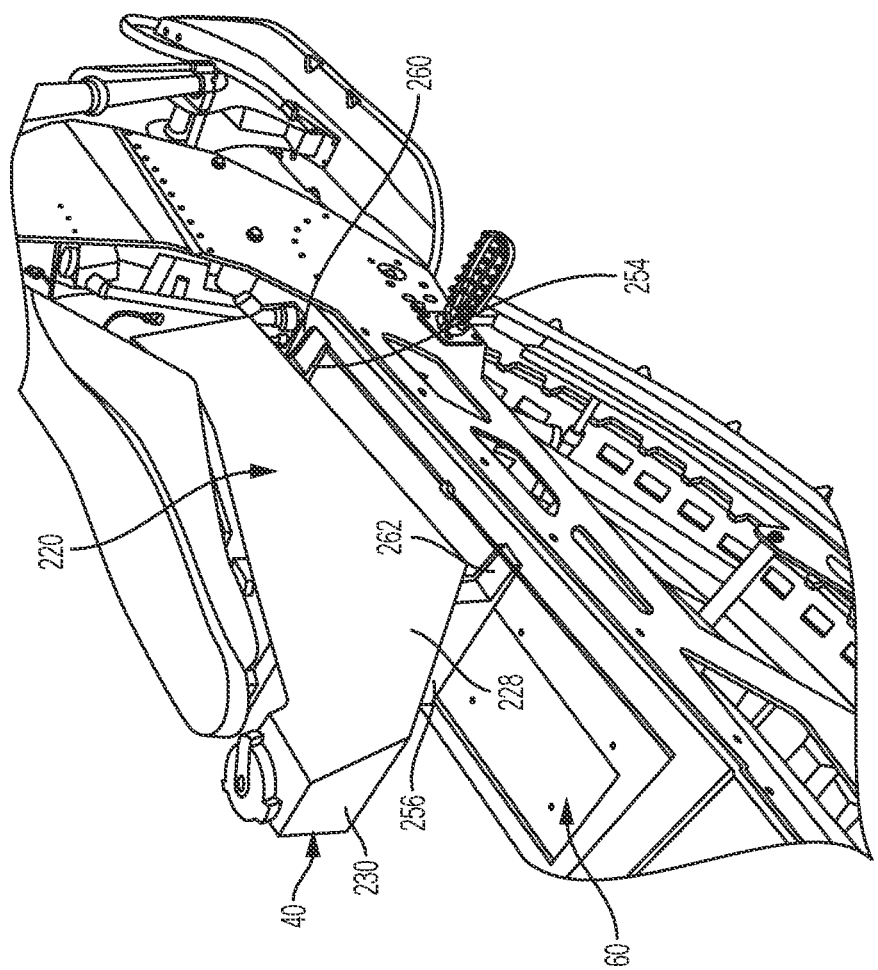
FIG. 20 is a right rear perspective view of the fuel tank.

With reference now to FIGS. 19 and 20, fuel tank 40 will be described in greater detail. As shown best in FIG. 19, fuel tank 40 includes a side wall 220, a front wall 222, a lower wall 224 which slants rearwardly, a low section 226 which could accommodate a fuel pump for powertrain 6, and a rear wall at 228. Rear wall 228 extends upwardly and rearwardly to a rear wall portion 230 which transitions into an upper wall 232 having a fuel filler cap 234. An upper wall 240 includes a generally flat portion 242, a rearwardly sloped section 244 and an upwardly sloped portion at 246. Brackets 250 and 252 are positioned on top wall 240 for mounting of seat 10 as described herein. Fuel tank 40 further comprises lower brackets 254 and 256 for mounting of the fuel tank to center section 60. As best shown in FIG. 20, brackets 254 and 256 are notched at 260 and 262 to provide access for an exhaust system as further described herein. As shown best in FIG. 19, fuel tank 40 can be coupled to center section 60 by way of fasteners 270 and 272 which are received in slots 80. The detail of slots 80 could be as disclosed in U.S. Pat. No. 7,533,749, the subject matter of which is incorporated herein by reference.

As shown best in FIG. 3, a forwardmost position of the fuel tank 40 is rearward of the belt drive axis 154 (line 192). Furthermore, the rotational axis 132 of the driveshaft 130 is vertically higher than at least a portion of the fuel tank 40, namely at least portion 226. That is, as shown in FIG. 3, line 274 running through the transmission drive axis 132 (see FIG. 12) extends through the fuel tank portion 126. Also, the fuel tank is supported by the tunnel 22, and the rotational axis 132 of the driveshaft 130 is vertically higher than at least a portion of the tunnel.

Figure 21:
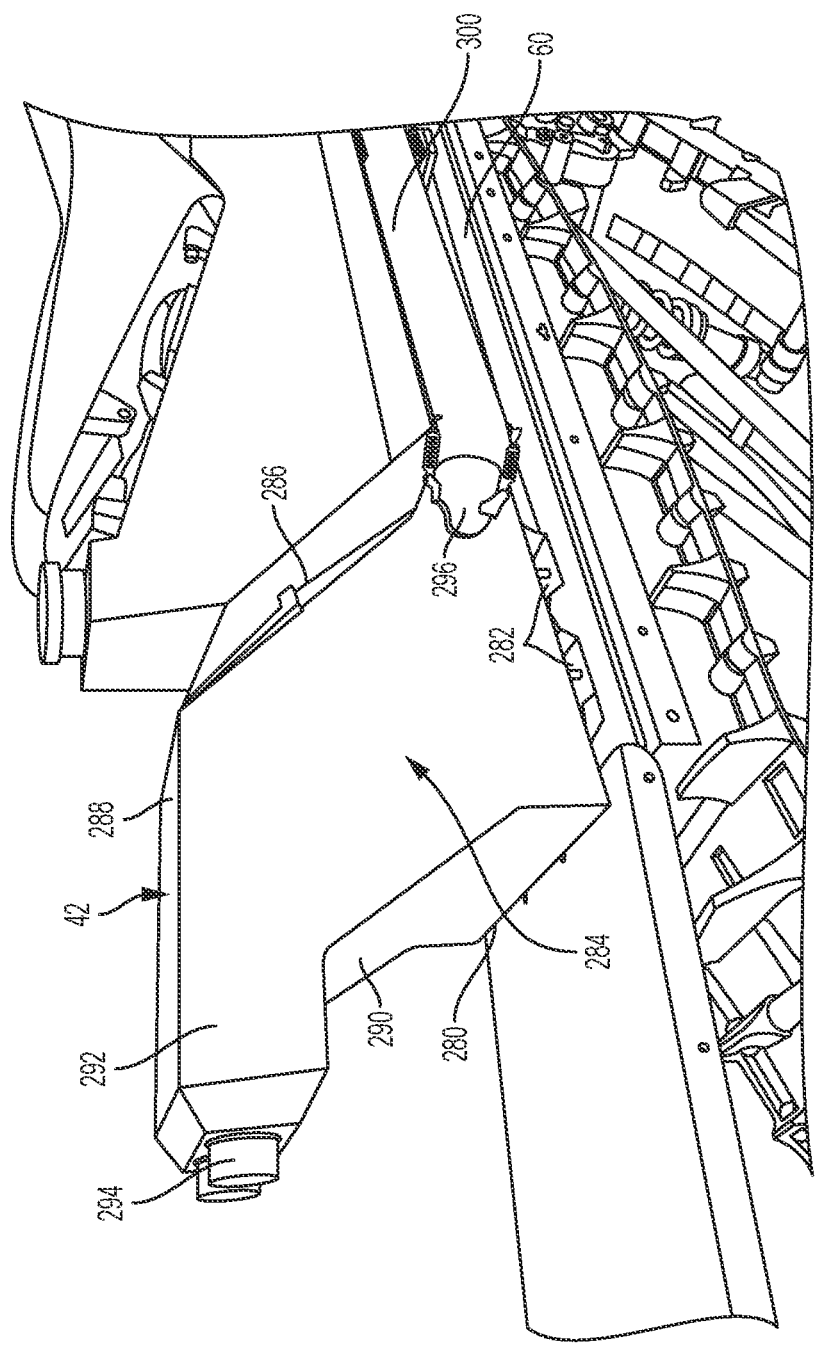
FIG. 21 is right rear perspective view showing the muffler.
Figure 22:
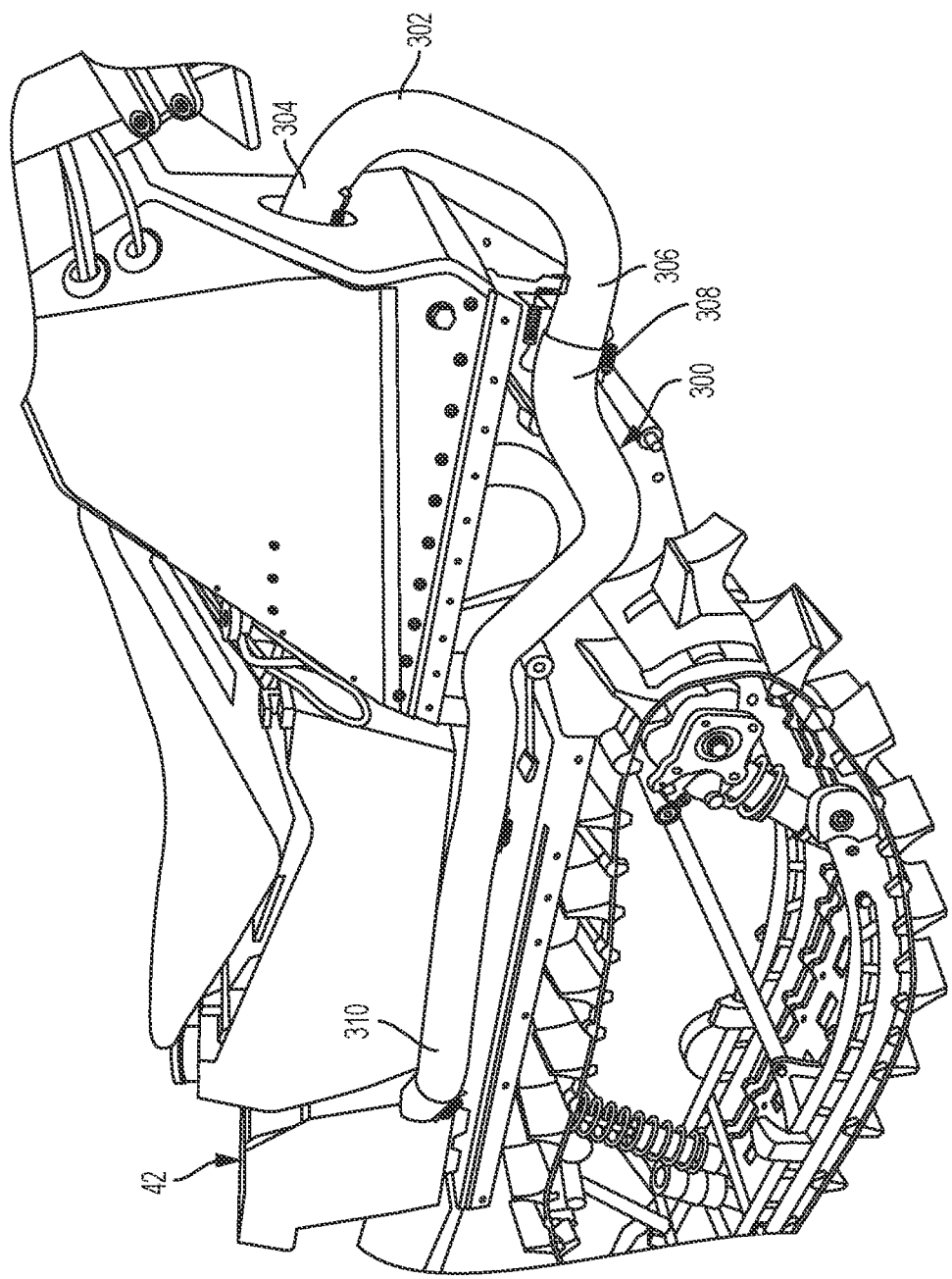
FIG. 22 is left front perspective view showing the exhaust system.

With reference now to FIGS. 21 and 22, exhaust system will be described in greater detail. As shown best in FIG. 21, the exhaust system includes muffler 42 which is mounted to center portion 60 of the frame. Muffler 42 includes a lower wall 280 having brackets 282, side walls 284, front wall 286, top wall 288, rear wall 290, rearwardly extending projection 292 having exhaust tubes at 294. An inlet tube is provided at 296 for receiving the exhaust through exhaust hose 300 which is coupled to an exhaust manifold at 302 (FIG. 22). Exhaust manifold 302 includes an inlet portion at 304 which couples to exhaust port 96 (FIG. 12) and an outlet portion 306 which couples to an inlet portion 308 of hose 300. An outlet portion 310 of hose 300 couples to the inlet portion 296 of muffler 42. As best shown in FIG. 21, hose 300 tucks into the notched portions 260 and 262 (FIG. 20) of brackets 254 and 256. Muffler 42 is coupled to the center section 60 by way of brackets 282 much the same way as the fuel tank 40 as described above.

With reference again to FIG. 19, seat 10 couples to the top of the fuel tank 40 and particularly to brackets 250 and 252. As shown, seat 10 conforms to the tank surfaces 244 and 246 such that the seat is nested against the tank 10.

Figure 23:
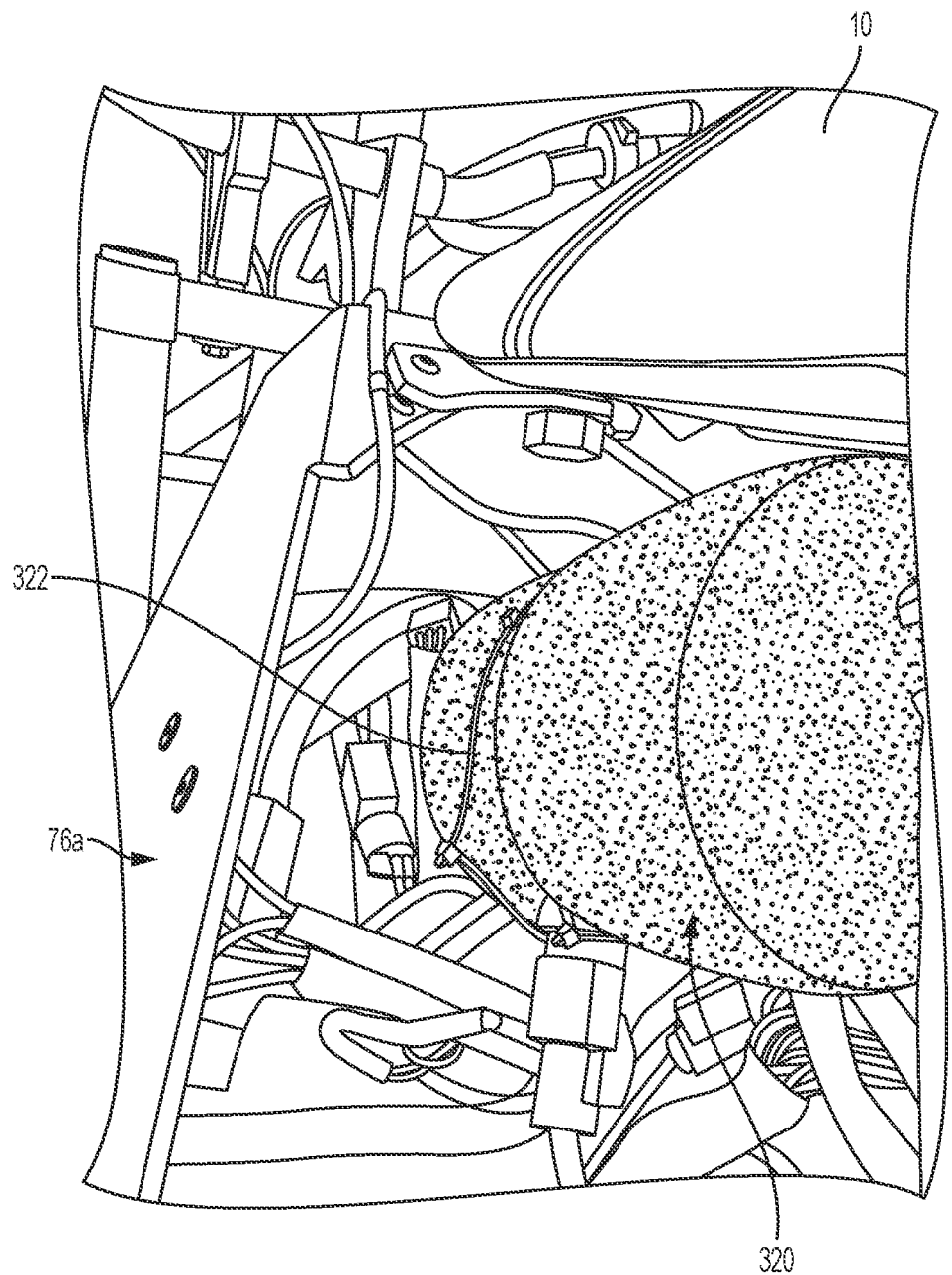
FIG. 23 is a left rear perspective view of the air intake system.

As shown in FIG. 23, an air intake system 320 is provided including a filter 322 positioned under the seat 10 and rearward or the cover portion 76a. Air intake system would be connected to the air intake port 94 (FIG. 12). Alternatively, an airbox can be provided in the cover 76 through an opening 340, as shown in FIG. 6.

With reference again to FIG. 1, ski 44 is comprised of a single ski and could be as wide, or wider than the belt 36, as more fully disclosed in our U.S. patent application Ser. No. 15/449,467, filed Mar. 3, 2017, the subject matter of which is incorporated herein by reference. Alternatively, ski could include multiple skis as more fully disclosed in our U.S. patent application Ser. No. 15/165,862, filed May 26, 2016, the subject matter of which is incorporated herein by reference.

With reference to FIG. 1, the design of the snow bike also prevents deep snow from contacting the belt paddles. As shown, the front panel portion includes an upper panel portion 74a and a lower portion 74b. The belt drive axis 154 is above the lower edge of panel portion 74b, thus the snow does not contact the upper paddles of belt 36 adding a reverse torque to the belt drive.

With reference now to FIG. 11, a cooling system 330 includes first and second hoses 332 and 334 (FIG. 10) which circulate cooling water through internal channels 336, 338 (FIG. 11), to make a U-shaped flow pattern in and out of the center section 60 to cool engine 90. This cooling function is more thoroughly described in our U.S. Pat. No. 7,353,898, the subject matter of which is incorporated herein by reference.

Thus the snow bike 2 of the present disclosure has numerous advantages over prior snow bikes. First, and as best shown in FIG. 3, the rider position at 188 is over the track 36, not over the ski 44. This provides better weight distribution for the ski bike 2. Furthermore, due to the dedicated design of the snow bike, the overall weight is significantly lower than a snow bike that has been converted from a dirt bike. Weight reduction is also achieved through the elimination of the jackshaft of prior designs which eliminates that weight of the jackshaft, another chain and the bearings associated with the jackshaft.

Also as mentioned above, due to the fact that the belt drive axis 154 is forward of the foot pegs 58, the track 36 can be lengthened to a 146" track. This provides significantly improved traction to the snow bike 2. Also as mentioned above, the suspension has improved the travel from 9 inches on a typical snow bike to 12 inches on the present design. This has been accomplished by the lengthened front control arm 28 as described herein and the location of the axis of rotation 204 of the front control arm (FIG. 4) relative to the belt drive axis 154. Normally, a snow vehicle with 12" of suspension travel will not climb mountains, but with the present design and the length of the track, this vehicle is able to climb mountains.

Also to have proper weight distribution between the ski 44 and the belt 36, a distance is provided between the ski bolt 45 and the belt drive axis 154, and is shown in FIG. 3 as $X_4$. As shown, $X_4$ is approximately 34 inches, but could be in a range of 32 to 38 inches. Also, a distance $X_5$ (FIG. 3) from the handle bar grip 18 to the belt drive axis is 10 inches but could be in the range of 8 to 14 inches. Furthermore a distance $X_6$ from the handle bar grip 18 to the front edge of the foot pegs 58 is 10 inches but could be in the range of 12 to 16 inches.

Furthermore, as mentioned above, the engine has been moved forward and up from prior snow bikes. As shown in FIG. 3, a vertical distance Y as measured from the ground to the transmission drive axis 132 is shown to be 28 inches, but could be in a range of 24 to 30 inches, and as mentioned before is in front of the foot pegs by a distance $X_1$.

As shown herein, the substantial majority of the components are shown as aluminum fabrications, but it should be understood that the components such as the fuel tank 44, cover 76, and others could be formed from a plastic material. Furthermore, the foot supports are shown herein as foot pegs 58, but a running board could be provided, similar to a snowmobile running board, such as that shown in U.S. Pat. No. 9,446,810 or 8,919,477, the subject matter of which are incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A snow vehicle, comprising:
a vehicle frame extending along a longitudinal centerline;
a seat supported by the vehicle frame;
a powertrain assembly supported by the vehicle frame and comprising an engine operably coupled to a transmission;
a fuel tank fluidly coupled to the engine;
an exhaust assembly fluidly coupled to the engine and including at least a muffler and an exhaust conduit extending between a portion of the engine and the muffler, the muffler positioned completely rearwardly of the seat, and a portion of the muffler vertically overlaps a portion of the fuel tank, and at least a portion of the engine, the fuel tank, and the muffler are longitudinally aligned with each other;
a rear suspension assembly comprising at least a tunnel; and
a drive belt operably coupled to the powertrain assembly.

2. The snow vehicle of claim 1, wherein the fuel tank and at least a portion of the exhaust assembly is positioned below the seat.

3. The snow vehicle of claim 2, further comprising an air intake assembly fluidly coupled to the engine and longitudinally aligned with the seat.

4. The snow vehicle of claim 3, further comprising a cover configured to support the air intake assembly and the engine.

5. The snow vehicle of claim 4, wherein the cover extends along a forward portion of the seat.

6. The snow vehicle of claim 3, wherein at least a portion of the air intake assembly is positioned above the engine and the exhaust assembly.

7. The snow vehicle of claim 1, wherein a fill cap of the fuel tank is positioned intermediate the seat and the muffler.

8. The snow vehicle of claim 1, wherein a forwardmost portion of the muffler is positioned forward of a rearwardmost portion of the fuel tank.

9. A snow vehicle, comprising:
a vehicle frame extending along a longitudinal centerline;
a powertrain assembly supported by the vehicle frame and comprising an engine operably coupled to a transmission;
a fuel tank fluidly coupled to the engine, and each of the fuel tank and the transmission intersect the longitudinal centerline;
an exhaust assembly fluidly coupled to the engine and including at least a muffler and an exhaust conduit extending between a portion of the engine and the muffler;
a rear suspension assembly comprising at least a tunnel; and
a drive belt operably coupled to the powertrain assembly, and the tunnel is configured to vertically separate the drive belt from the fuel tank and the muffler, wherein the transmission comprises a transmission output, and the transmission output is forward of the fuel tank.

10. The snow vehicle of claim 9, further comprising a seat supported by the vehicle frame, and the fuel tank and at least a portion of the exhaust assembly is positioned below the seat.

11. The snow vehicle of claim 10, wherein a portion of the exhaust conduit is positioned adjacent the fuel tank.

12. The snow vehicle of claim 10, wherein the seat extends from a position adjacent a portion of the engine and along the fuel tank.

13. The snow vehicle of claim 9, wherein both the fuel tank and the muffler are positioned above an upper surface of the tunnel.

14. The snow vehicle of claim 13, wherein the muffler is positioned rearwardly of the fuel tank.

15. The snow vehicle of claim 9, further comprising a gear shifter linkage operably coupled to the transmission, and at least a portion of the gear shifter linkage positioned rearwardly of the drive belt.

16. The snow vehicle of claim 9, wherein the transmission is longitudinally aligned with a portion of the engine.

17. The snow vehicle of claim 9, further comprising an engine compartment defined by at least one panel, and the engine and the transmission are positioned within the engine compartment.

18. A snow vehicle, comprising:
a vehicle frame extending along a longitudinal centerline;
a seat supported by the vehicle frame;
a powertrain assembly supported by the vehicle frame and an engine operably coupled to a transmission;
a fuel tank fluidly coupled to the engine;
a gear shifter linkage operably coupled to the transmission;
an exhaust assembly fluidly coupled to the engine and including at least a muffler and an exhaust conduit extending between a portion of the engine and the muffler;
a rear suspension assembly comprising at least a tunnel, and the tunnel includes at least an upper surface, a first side, and a second side; and
a drive belt operably coupled to the powertrain assembly at a transmission output, and an envelope is defined between the upper surface of the tunnel, the first side of the tunnel, the second side of the tunnel, and an upper surface of the seat, and at least a portion of the exhaust conduit is positioned within the envelope, and a portion of the gear shifter linkage is positioned rearwardly of the transmission output, wherein a forward extent of the fuel tank is positioned rearwardly of the forward extent of the seat.

19. The snow vehicle of claim 18, wherein the tunnel defines a maximum width extending between a rearward-most portion of the first side and a rearward-most portion of the second side, and the maximum width of the tunnel is at least as great as a width of the exhaust assembly.

* * * * *